(12) United States Patent
Kikuchi et al.

(10) Patent No.: US 7,977,276 B2
(45) Date of Patent: Jul. 12, 2011

(54) EXHAUST GAS PURIFYING CATALYST AND METHOD OF PRODUCING THE SAME

(75) Inventors: Hiroto Kikuchi, Hiratsuka (JP); Katsuo Suga, Yokohama (JP); Masanori Nakamura, Yokosuka (JP); Hironori Wakamatsu, Yokohama (JP); Kazuyuki Shiratori, Yokohama (JP); Toshiharu Miyamura, Yokohama (JP); Jun Ikezawa, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 419 days.

(21) Appl. No.: 12/062,884

(22) Filed: Apr. 4, 2008

(65) Prior Publication Data
US 2008/0254978 A1     Oct. 16, 2008

(30) Foreign Application Priority Data

Apr. 12, 2007 (JP) ................ 2007-104744
Dec. 13, 2007 (JP) ................ 2007-322197

(51) Int. Cl.
*B01J 23/10* (2006.01)
(52) U.S. Cl. ......... 502/325; 502/303; 502/304; 427/380
(58) Field of Classification Search .............. 427/380; 502/303, 304, 325
See application file for complete search history.

(56) References Cited

U.S. PATENT DOCUMENTS

2002/0049137 A1 * 4/2002 Morikawa et al. ............ 502/351
2007/0167319 A1   7/2007 Shiratori et al.

FOREIGN PATENT DOCUMENTS

| EP | 1 563 863 A1 | 8/2005 |
| EP | 1 563 893 A1 | 8/2005 |
| JP | 2000-015097 A | 1/2000 |
| JP | 2005-111336 A | 4/2005 |
| JP | 2005-185969 A | 7/2005 |

* cited by examiner

*Primary Examiner* — Stuart Hendrickson
*Assistant Examiner* — Richard M Rump
(74) *Attorney, Agent, or Firm* — Young Basile

(57) ABSTRACT

Disclosed is an exhaust gas purifying catalyst exhibiting excellent purification performance for a long period of time by suppressing coagulation of a noble metal. A catalyst powder comprises a noble metal and first and second compounds. In the catalyst powder, the first compound carries the noble metal and is separated from another first compound carrying a noble metal by the second compound. At least one catalyst layer comprising the catalyst powder is formed on an inner surface of a substrate. The catalyst layer has fine pores. A fine pore volume of fine pores having a fine pore diameter of greater than 0.1 μm to less than or equal to 1 μm is 10% to 60% of the fine pore volume of fine pores having a pore diameter of 1.0 μm or less.

20 Claims, 7 Drawing Sheets

EXHAUST GAS PURIFYING CATALYST AND METHOD OF PRODUCING THE SAME

CROSS-REFERENCE TO RELATED APPLICATIONS

This application claims priority from Japanese Patent Application Ser. No. 2007-104744, filed Apr. 12, 2007 and 2007-322197, filed Dec. 13, 2007, each of which is incorporated herein in its entirety by reference.

TECHNICAL FIELD

The invention relates to an exhaust gas purifying catalyst for purifying exhaust gases discharged from an internal combustion engine and to a method of producing the same.

BACKGROUND

Exhaust gas purifying catalysts generally have noble metal particles carried on the surfaces of metal oxide particles to convert toxic components (e.g., unburned hydrocarbon (HC) or carbon monoxide (CO)) contained in an exhaust gas into nontoxic components such as water, carbon dioxide ($CO_2$) and the like through oxidation with the noble metal particles.

In recent years, there has been an increasing demand for an exhaust gas purifying catalyst capable of performing highly efficient purification of unburned HC or carbon monoxide to satisfy regulations concerning automobile emissions, which have become increasingly strict. In response to such a demand, various efforts have been made to improve the exhaust purifying catalyst. For example, one of the conventional methods of producing the exhaust gas purifying catalyst is based on the fact that an increase in surface area of noble metal particles contained in the catalyst leads to an improvement in the purifying capabilities of the catalyst. In this method, the surface area of the noble metal particle is increased in order to increase surface energy by reducing the diameter of the noble metal particle contained in the catalyst, thereby improving the performance of the catalyst.

In this process, the noble metal particle for the exhaust gas purifying catalyst is in an ultra fine state of several nanometers or less at an initial stage. However, when the catalyst is put into a practical use and exposed to an oxidative atmosphere at high temperatures, the surface of the noble metal particle is oxidized. Further, adjacent noble metal particles are coagulated and fused together to form a coarsened particle of several dozen nanometers to thereby decrease the surface area of the noble metal particles, thus causing a periodic reduction in the rate at which the catalyst purifies the toxic substances.

Japanese Patent Laid-open Publication No. 2000-15097 discloses an exhaust gas purifying catalyst having noble metal particles uniformly dispersed in whole catalyst layers formed inside a substrate, through which plural fine pores are formed in a honeycomb shape, by preventing coagulation of the noble metal particles. One method produces catalyst powder by mixing a noble metal colloid solution with a metal alkoxide, followed by decomposition of the metal alkoxide via hydrolysis.

In addition, as a method of preparing a noble metal particle having a high surface area to ensure higher activity by preventing the noble metal particle from being coarsened and decreased in surface area, a reversed micelle method has been developed in the art. In the reversed micelle method, after preparing an emulsion in which a reversed micelle of a solution containing raw noble metal particles is formed, a particulate noble metal is precipitated from the reversed micelle. The reversed micelle is then disrupted to obtain the precipitates, which in turn are treated by a series of processes such as filtering, drying, grinding and firing to provide a catalyst.

According to a reversed micelle method disclosed in Japanese Patent Laid-open Publication No. 2005-111336, a heat-resistant catalyst is prepared by mixing a reversed micelle solution containing a noble metal colloid solution in a micelle, a reversed micelle solution containing a metal hydroxide solution in a micelle and a metal alkoxide, followed by firing the mixture. Another reversed micelle method disclosed in Japanese Patent Laid-open Publication No. 2005-185969 includes a process of adjusting a reversed micelle solution containing a solution of noble metal salts and a solution of metal salts as at least one co-catalyst component on the same base material in order to provide a highly heat-resistant catalyst.

BRIEF SUMMARY

Disclosed herein is an exhaust gas purifying catalyst. One such catalyst includes, by example, at least one catalyst layer formed on an inner surface of a substrate and comprising a catalyst powder. The catalyst power comprises a noble metal, a first compound configured to carry the noble metal and a second compound configured to separate the noble metal and the first compound from another noble metal and first compound. The catalyst layer or layers has fine pores with a pore diameter of greater than 0.1 μm and less than or equal to 1 μm and fine pores with a pore diameter of 0.1 μm or less. The pore volume of the fine pores with the pore diameter of greater than 0.1 μm and less than or equal to 1 μm is equal to 10% to 60% of a fine pore volume of the fine pores with the pore diameter of 1.0 μm or less.

Also disclosed are methods of preparing an exhaust gas purifying catalyst. For example, the method includes preparing a catalyst powder and forming the catalyst powder on an inner surface of a substrate. The catalyst powder is prepared by carrying a noble metal on a first compound, making a slurry of a second compound by dispersing the second compound or a precursor of the second compound in water, dispersing the first compound carrying the noble metal in the slurry of the second compound, drying the slurry of the second compound having the first compound and the noble metal and firing the dried slurry. The catalyst powder is formed on the inner surface of the substrate by preparing a slurry of the catalyst powder by adding a fired-off compound, coating the slurry of the catalyst powder on the substrate, drying the coated slurry of the catalyst powder and forming a catalyst layer having fine pores by firing the dried slurry of the catalyst powder. A portion of the fine pores have a pore diameter of greater than 0.1 μm and less than or equal to 1 μm.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Exemplary embodiments of the invention disclosed herein are next described with reference to the accompanying drawings.

Figure 1A:
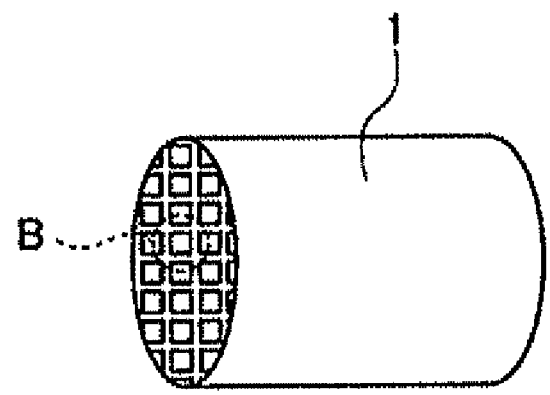
FIGS. 1A and 1B are explanatory views of a substrate having an exhaust gas purifying catalyst according to an embodiment of the invention, with FIG. 1A being a perspective view and FIG. 1B being an exploded cross-sectional view.
Figure 1B:
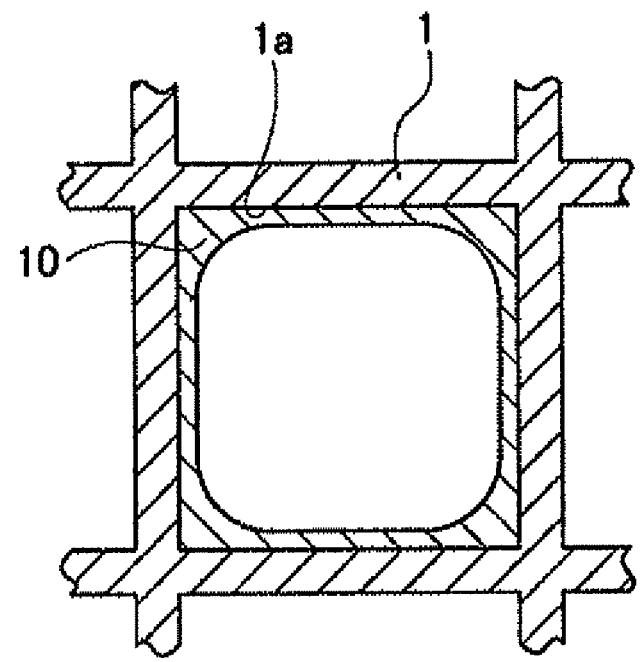

FIG. 1A is a perspective view of one embodiment of a substrate 1, which is formed of a heat resistant material, such as ceramic and the like, and has an approximately cylindrical shape in which a plurality of fine pores are formed in a honeycomb pattern from one end to the other end. FIG. 1B is an enlarged cross-sectional view of one cell of the substrate 1 indicated by dotted circle B in FIG. 1A. Referring to FIG. 1B, a catalyst layer 10 is formed on an inner surface 1a of the substrate 1, which partitions one cell of the substrate 1 from other cells thereof. Here, the shape of the substrate 1, the size of fine pores and the thickness of the catalyst layer 10 shown in FIGS. 1A and 1B are different from those of a substrate and a catalyst layer used in practice for easy understanding of the invention. Thus, it should be noted that the exhaust gas purifying catalyst of the invention is not limited to the shape of the substrate 1, the size of fine pores and the thickness of the catalyst layer 10 shown in FIGS. 1A and 1B.

Figure 2A:
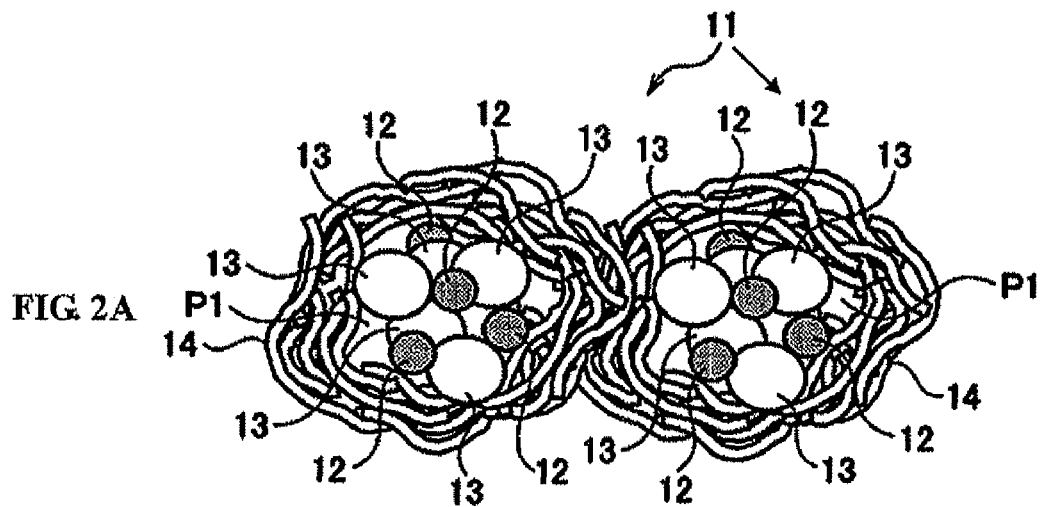
FIGS. 2A and 2B are views of the exhaust gas purifying catalyst according embodiments of the invention.
Figure 2B:
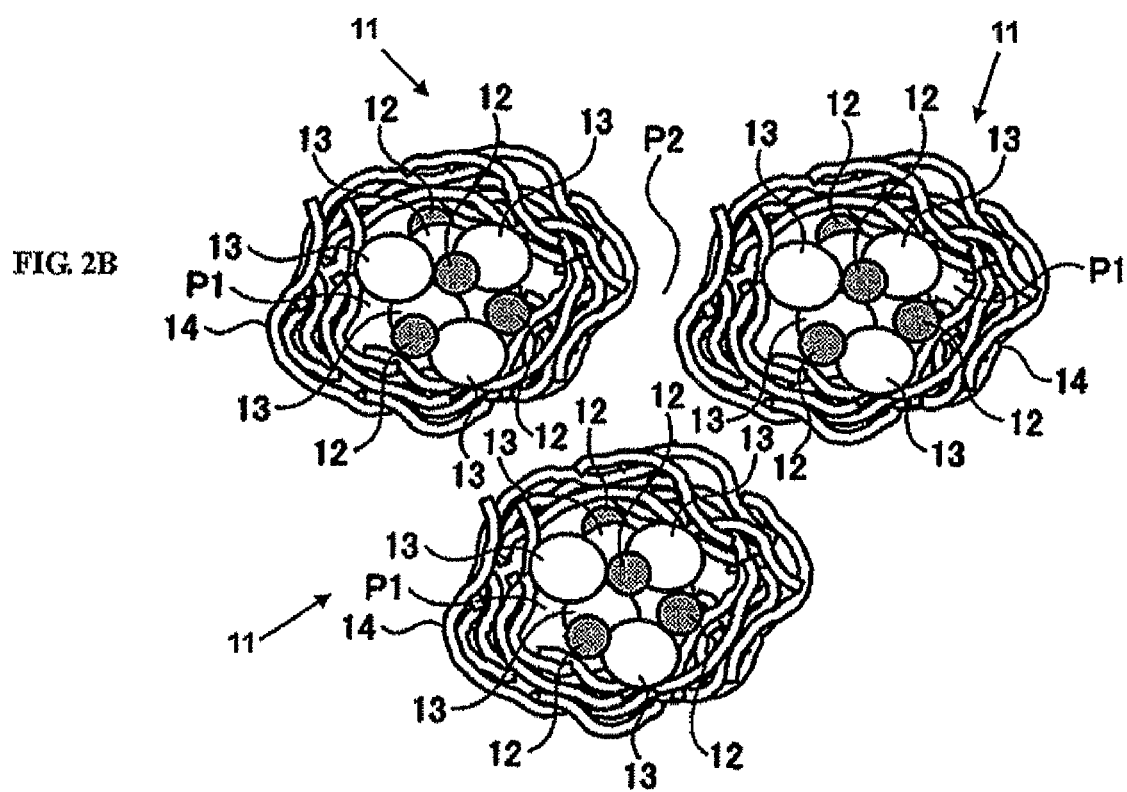

According to this embodiment, the exhaust gas purifying catalyst has at least one catalyst layer 10 including a catalyst powder. Referring to FIGS. 2A and 2B, a catalyst powder 11 comprises a noble metal 12, a first compound 13 and a second compound 14. The catalyst powder 11 is configured such that the noble metal 12 is carried by one or more particles of the first compound 13, and a single particle or group of first compounds carrying the noble metal 12 is separated from another particle or group of first compounds by the second compound 14. Further, in the exhaust gas purifying catalyst, the catalyst layer 10 has fine pores P1 formed in the catalyst powder 11 and other fine pores P2 formed between the catalyst powders 11. Among these fine pores, the volume having a fine pore diameter in the range of greater than 0.1 and less than or equal to 1 μm, also stated as greater than 0.1 to 1 μm, is 10 to 60% of the volume of fine pores having a fine pore diameter of 1 μm or less.

As shown in FIGS. 1A to 2B, in the exhaust gas purifying catalyst according to this embodiment, the catalyst layer 10 comprises the catalyst powder 11 tin which the first compound 13 carries the noble metal 12. With this configuration, the first compound 13 serves as an anchor material for chemical coupling to the noble metal 12. Consequently, the first compound 13 suppresses movement of the noble metal 12.

Additionally, the first compound 13 carrying the noble metal 12 is enclosed by the second compound 14, which can be alumina and the like. With this configuration, the second compound 14 physically prevents separation of the noble metal 12 from the first compound 13. Further, the second compound 14 physically separates particles of the first compound 13 from other particles of the first compound 13, thereby preventing coagulation of particles of the first compound 13, which in turn prevents coagulation of the noble metals 12 carried by particles of the first compound 13.

In the catalyst powder 11 having the configuration as described above, a sufficient diffusion of exhaust gas is necessary for the exhaust gas to reach the noble metal 12. The inventors have found that the second compound 14 enclosing the noble metal 12 and the first compound 13 requires pores having a predetermined range of characteristics in the catalyst powder 11. Specifically, initial fine pores of the catalyst have a fine pore volume in the range of 0.24 $cm^3/g$ to 0.8 $cm^3/g$. If the initial fine pores of the catalyst have a fine pore volume less than 0.24 cm3/g, then the diffusivity of the exhaust gas is insufficient. Further, if the initial fine pores of the catalyst have a fine pore volume greater than 0.8 $cm^3/g$, then the diffusivity of the exhaust gas cannot be improved.

Figure 3:
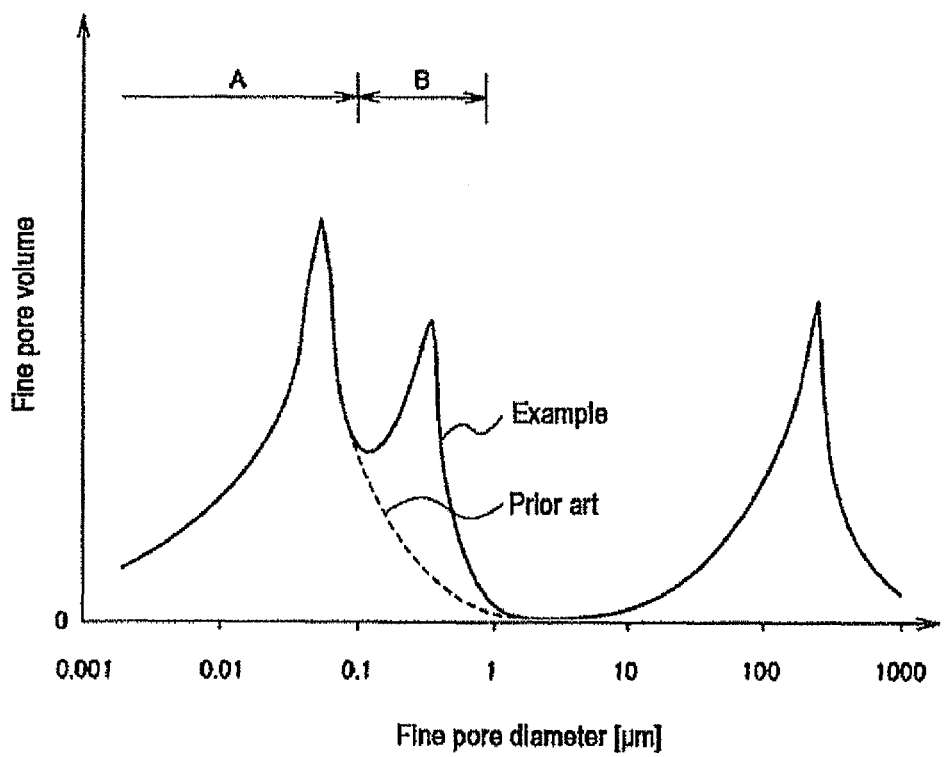
FIG. 3 is a graph depicting a distribution curve of fine pores in a catalyst layer of the exhaust gas purifying catalyst according to embodiments of the invention.

FIG. 3 is a diagrammatic graph of a distribution curve of fine pores in the catalyst layer of the exhaust gas purifying catalyst according to the invention. In the distribution curve shown in FIG. 3, the volume of fine pores having a fine pore diameter greater than 1 μm represents surface scars or cracks and is not the volume of fine pores in the catalyst layer. Hence, the fine pore volume in the catalyst layer is represented by the fine pore volume of fine pores having a fine pore diameter of 1 μm or less. The exhaust gas purifying catalyst of this embodiment exhibits peaks of fine pore volumes at a fine pore diameter less than or equal to 0.1 μm and at a fine pore diameter in the range of greater than 0.1 to 1 μm. The peak of fine pore volume at the fine pore diameter less than or equal to 0.1 μm may be determined from the microscopic fine pores P1 formed in the catalyst powder as shown in FIG. 2B. The peak of fine pore volume at the fine pore diameter in the range of greater than 0.1 to 1 μm may be determined from the fine pores P2 formed between the catalyst powders as shown in FIG. 2B. In this embodiment, the fine pores P2 that form gaps between the catalyst powders are sufficiently secured by 10 to 60% fine pore volume occupied by the fine pores that have the diameter of greater than 0.1 to 1 μm. As such, since a passage (path) through which the exhaust gas diffuses in the catalyst layer is sufficiently sustained, diffusion of gas into the catalyst layer can be improved. On the other hand, a conventional catalyst indicated by a dotted line in FIG. 3 exhibits a peak of fine pore volume only at a fine pore diameter of 0.1 μm or less. In other words, the conventional catalyst does not have the peak of fine pore volume at the fine pore diameter of greater than 0.1 to 1 μm. In this conventional catalyst, less than 10% of the fine pore volume of the catalyst layer is composed of fine pores having a fine pore diameter of greater than 0.1 to 1 μm, and the catalyst layer has a dense structure, thereby hindering diffusion of the exhaust gas into the catalyst layer.

In the exhaust gas purifying catalyst of this embodiment, the catalyst powder 11 is coated on the substrate 1 to form the catalyst layer 10 such that the fine pores having a fine pore diameter of greater than 0.1 to 1 μm have a volume equal to 10 to 60% of the fine pore volume of fine pores having a pore diameter of 1.0 μm or less in the catalyst layer 10. This is to allow the exhaust gas to diffuse from the surface of the catalyst layer 10 to penetrate deeply into the catalyst layer 10, providing excellent catalyst performance. When the fine pores having the fine pore diameter of greater than 0.1 to 1 μm have less than 10% volume of the fine pores having the pore diameter of 1.0 μm or less, the exhaust gas cannot diffuse sufficiently into the catalyst layer 10, deteriorating catalyst performance. Further, when the fine pores having the fine pore diameter of greater than 0.1 to 1 μm make up more than 60% of the fine pore volume of fine pores having a pore diameter of 1.0 μm or less, the number of pores in the catalyst layer is significantly increased. This may reduce the strength of the catalyst layer irrespective of its satisfactory gas diffusivity.

Assuming that the fine pore volume of pores having a diameter of 0.1 μm or less is A and the fine pore volume of pores having a diameter of greater than 0.1 to 1 μm is B, B is 10 to 60% of the fine pore volume of pores having the pore diameter of 1.0 μm or less, and preferably, $B/A \geqq 0.1$. When B/A is greater than or equal to 0.1, the exhaust gas can easily pass through the catalyst layer, thus ensuring a desired effect of improving the gas diffusivity.

The volume B can also be 20 to 60% of the fine pore volume of the pores having the pore diameter of 1.0 μm or less. This volume B further enhances the gas diffusivity to thereby improve the catalyst performance.

The volume B can also be 30 to 50% of the fine pore volume of the pores having the pore diameter of 1.0 μm or less. The volume B in this range ensures a particularly good gas diffusivity to provide well-balanced compatibility with the strength of the good catalyst layer, thus realizing superior catalyst performance as an exhaust gas purifying catalyst.

Any known method, such as mercury intrusion porosimetry, can be used to measure fine pore distribution in the catalyst layer in order to obtain a ratio of fine pores having a fine pore diameter in a specific range in the catalyst layer.

The first compound 13 of the catalyst powder 11 may consist of 70 to 85 wt % $CeO_2$ and 15 to 30 wt % $ZrO_2$. When the first compound 13 mainly comprises $CeO_2$, a compound consisting of 70 to 85 wt % $CeO_2$ and 15 to 30 wt % $ZrO_2$ (summing to 100%) is provided as the first compound 13 for the efficient purification of exhaust gas. Particularly, when Pt is utilized as the noble metal 12 to be carried by the first compound 13, the performance of the catalyst can be further enhanced by carrying Pt with a composite compound of $CeO_2$ and $ZrO_2$ rather than with $CeO_2$ alone. Without being bound to any theory, this is attributed to a synergistic increase in oxygen holding capability of $CeO_2$ by adding $ZrO_2$ thereto. In addition, the composite compound of the first compound increases adsorption of Pt to the first compound 13, thereby preventing heat-induced coagulation of Pt. Such effect of increasing the oxygen holding capability of $CeO_2$ based on the use of the composite compound can be remarkably exhibited at a $ZrO_2$ content of 15 wt % or more, but can be relatively weakened as the $ZrO_2$ content increases above 30 wt %.

Additionally, the first compound 13 may be a composite compound of $ZrO_2$ and $La_2O_3$. In the catalyst powder 11, the first compound 13 may consist of 90 to 99 wt % $ZrO_2$ and 1 to 10 wt % $La_2O_3$. When the first compound 13 comprises $ZrO_2$ as a main component, a compound consisting of 90 to 99 wt % $ZrO_2$ and 1 to 10 wt % $La_2O_3$ (summing to 100%) is provided as the first compound 13 for the efficient purification of exhaust gas. When Rh is utilized as the noble metal 12 to be carried by the first compound 13, Rh can be carried with a composite compound of $ZrO_2$ and $La_2O_3$ rather than with $ZrO_2$ alone. When the first compound comprises $La_2O_3$ in addition to $ZrO_2$, $ZrO_2$ coagulation can be prevented so that Rh can be prevented from being embedded in $ZrO_2$ particles. Such effect based on the use of the composite compound can be remarkably exhibited at a $La_2O_3$ content of 1 wt % or more.

However, when the $La_2O_3$ content increases above 10 wt % in the first compound, $La_2O_3$ tends to be eluted and cover Rh.

The second compound 14 of the catalyst layer 11 can comprise alumina. For achieving the purification of exhaust gas, diffusion of exhaust gas to the noble metal through the second compound 14 is necessary. In this regard, since gamma (γ)-alumina is porous, has good gas diffusivity and exhibits superior heat resistance, it is one preferred compound for the second compound 14.

The second compound 14 of the catalyst layer 11 may be alumina containing 5 to 15 wt % $CeO_2$ and 3 to 10 wt % $ZrO_2$. Adding $CeO_2$ or $ZrO_2$ to alumina in the second compound 14 can suppress performance deterioration of the catalyst after durability testing of the catalyst. This is attributed to the fact that when $CeO_2$ or $ZrO_2$ is added to alumina, it is possible to prevent γ-alumina from being converted into α-alumina and to suppress degradation (sintering) of alumina by heat. Although addition of either $CeO_2$ or $ZrO_2$ to alumina can suppress performance degradation of the catalyst after the durability test, the addition of both $CeO_2$ and $ZrO_2$ to alumina can further effectively suppress performance degradation of the catalyst after the durability test. It has been found that when the $CeO_2$ and $ZrO_2$ contents in alumina are below the lower limits of 5 wt % and 3 wt %, respectively, these components have no effect upon the catalyst. On the contrary, when the $CeO_2$ and $ZrO_2$ contents in alumina are greater than these upper limits, there is high probability of performance degradation of the catalyst after the durability test.

The second compound 14 of the catalyst layer 11 may be alumina containing 3 to 10 wt % $La_2O_3$. Adding $La_2O_3$ to alumina in the second compound 14 can suppress performance deterioration of the catalyst after the durability test because addition of $La_2O_3$ to alumina results in suppression of heat-induced degradation (sintering) of alumina. When the $La_2O_3$ content in alumina is below 3 wt %, the addition of $La_2O_3$ has no effect upon the catalyst. In contrast, when the $La_2O_3$ content in alumina is greater than 10 wt %, there is high probability of performance degradation of the catalyst after the durability test.

The noble metal 12 of the catalyst powder 11 can be at least one metal selected from Pt, Pd and Rh. Pt, Pd and Rh all possess catalytic activity with respect to exhaust gas and are suitable as the noble metal 12 to be carried by a compound of Ce—Zr-Ox or Zr—LaOx, which is suitable for the first compound 13.

The catalyst layer 10 comprising the catalyst powder 11 as described above may be provided as a single layer on the inner surface 1a of the substrate 1 and may also be plural layers having different kinds of noble metal on the inner surface 1a of the substrate 1. In one embodiment, an underlayer described below is formed on the inner surface 1a of the substrate 1 and two catalyst layers having different noble metals are formed on the underlayer. When the plural catalyst layers having the different noble metals are formed thereon, the respective noble metals of the catalyst layers exhibit an excellent exhaust gas purification performance. The overall catalyst formed on the substrate 1 efficiently purifies the exhaust gas.

When the plurality of catalyst layers 10 are formed on the inner surface 1a of the substrate 1, an underlayer that does not contain the noble metal is preferably, although not necessarily, formed between the inner surface 1a of the substrate 1 and the catalyst layer 10. The underlayer that does not contain the noble metal is provided on the inner surface 1a of the substrate 1 rather than the catalyst layer 10 so that the underlayer embeds four corners of one cell that is partitioned by the inner surface 1a of the substrate 1 and has a square cross-sectional shape. Hence, among the plural catalyst layers, the catalyst layer contacting the underlayer achieves uniform thickness and thus can conduct effective purification of the exhaust gas.

The underlayer comprises at least one material selected from alumina and a hydrocarbon adsorptive compound. Alumina is a general substance to carry the noble metal in the catalyst layer and can be suitably used as an underlayer that does not contain the noble metal. When the hydrocarbon adsorptive compound is used as the underlayer, the underlayer can adsorb hydrocarbon contained in the exhaust gas during ignition of a gasoline engine. Hence, it is possible to enhance the exhaust gas purifying performance upon a so-called cold start. Non-limiting examples of the hydrocarbon adsorptive compound include zeolite and mesoporous silica.

When the plurality of catalyst layers 10 are formed on the inner surface 1a of the substrate 1, a suitable combination of catalyst powder in the catalyst layers comprises at least one noble metal selected from Pt and Pd, a first compound comprising 70 to 85 wt % $CeO_2$ and 15 to 30 wt % $ZrO_2$, and a second compound comprising alumina containing 5 to 15 wt % $CeO_2$ and 3 to 10 wt % $ZrO_2$. When the underlayer is not formed on the inner surface of the substrate, and two catalyst layers are formed directly thereon, the term "catalyst layer on the inner surface of the substrate" is used to mean the first catalyst layer directly on the substrate. When the underlayer is formed on the inner surface of the substrate and two catalyst layers are formed on the underlayer to constitute three layers on the inner surface of the substrate, the term "catalyst layer on the inner surface of the substrate" is used to mean the intermediate layer of catalyst. The outermost catalyst layer is described as the "surface catalyst."

When the plurality of catalyst layers 10 are formed on the inner surface 1a of the substrate 1, another suitable combination of the catalyst powder in the catalyst layers comprises at least one noble metal selected from Pt and Pd, a first compound comprising 70~85 wt % $CeO_2$ and 15~30 wt % $ZrO_2$, and a second compound comprising alumina containing 3-10 wt % $La_2O_3$. When the catalyst powder of the catalyst layer on the inner surface of the substrate comprises alumina containing 3~10 wt % $La_2O_3$ as the second compound instead of alumina containing 5~15 wt % $CeO_2$ and 3~10 wt % $ZrO_2$, the desirable catalyst performance of Pt and Pd can be sufficiently exhibited.

When the plurality of catalyst layers 10 are formed on the inner surface 1a of the substrate 1, a further suitable combination of the catalyst powder in the catalyst layers comprises Rh as the noble metal, the first compound comprising 90 to 95 wt % $ZrO_2$ and 1 to 10 wt % $La_2O_3$, and alumina as the second compound.

The catalyst powder of the surface catalyst layer can comprise 40 to 75 wt % of the first compound carrying the noble metal and 25 to 60 wt % of the second compound. With such a ratio of the first and second compounds, the surface catalyst layer can perform an effective purification of the exhaust gas.

Hereinafter, a method of producing the exhaust gas purifying catalyst according to one embodiment of the invention is described. This method includes a process of preparing a catalyst powder and a process of forming the catalyst powder on an inner surface of the substrate.

The process of preparing a catalyst powder includes carrying a noble metal with a first compound and dispersing a second compound or a precursor of the second compound in water, At least one compound selected from a cerium compound, a zirconium compound and a lanthanum compound is dissolved to obtain a slurry of the second compound. The first compound carrying the noble metal is dispersed in the slurry of the second compound. Then, the combination is dried and fired, thereby providing the catalyst powder.

The step of carrying the noble metal with the first compound can be performed by any method known to those skilled in the art. For example, slurry infiltration can be used for this step.

The step of dispersing the second compound or the precursor of the second compound in water, followed by dissolving at least one of the cerium compound, the zirconium compound and the lanthanum compound therein as needed to obtain the slurry of the second compound, can be carried out in any suitable order with respect to the step of carrying the noble metal. Any of the second compound and the precursor thereof can be dispersed in water.

Then, the first compound carrying the noble metal is dispersed in the slurry of the second compound or its precursor. For this dispersion, that is, releasing coagulated particles of the first compound carrying the noble metal and dispersing the released first compound in the second compound, a dispersing agent of organic compounds can be used. Alternatively, the dispersion can be performed using a homogenizer or any physical process based on an impact force by stirring at high speed.

After the dispersion, the slurry of the second compound or the precursor thereof is dried. Drying can be performed by using any suitable drying process, such as a spray drier-based drying process, a vacuum freeze drying process and the like, so long as maintenance of the first compound carrying the noble metal in a state of being enclosed by the second compound is ensured, and a required fine pore volume is greater than or equal to 0.24 $cm^3$/g and less than or equal to 0.8 $cm^3$/g.

Next, a desired catalyst powder is obtained by firing the dried slurry. Firing the dried slurry can be satisfactorily performed under any conventional condition used for a general exhaust gas purifying catalyst.

After the process of preparing the catalyst powder as described above, the catalyst powder is formed into a catalyst layer on the inner surface of the substrate. The process of forming the catalyst powder includes adding a compound, which can be removed by firing, to the catalyst powder to provide a slurry of the catalyst powder, coating the slurry to the substrate, and drying and firing the coated slurry to form the catalyst layer with fine pores, some of which have a fine pore diameter in the range of greater than 0.1 to 1 μm.

The catalyst layer formed by this process has a specific ratio of fine pores having a fine pore diameter in the range of greater than 0.1 to 1 μm with respect to the total amount of fine pores in the catalyst layer. For this purpose, the slurry of the catalyst powder is prepared by adding the compound (hereinafter referred to as a "fired-off compound"), which can be removed when firing the slurry. The added fired-off compound will be removed when firing the prepared slurry of the catalyst powder coated on the substrate. A fired-off portion of the slurry contributes to formation of the fine pores having a fine pore diameter of greater than 0.1 to 1 μm in the catalyst layer. Examples of the fired-off compound include, but are not limited to, resin powders, starch, carbon black, activated carbon and the like. Additionally, any material can be used as the fired-off compound so long as the material can be removed when firing the slurry of the second compound. Further, the fired-off compound can be prepared as powder having a particle diameter of 1 μm or less, or can be prepared as powder having a particle diameter of 1 μm or more since the fired-off compound is ground to the size of 1 μm or less when preparing the slurry. Moreover, the fired-off compound can be a liquid, for example, methylcellulose.

Embodiments of the invention are described in more detail with reference to the following Examples along with Comparative Examples.

Examples 1 to 8 are different from one another in view of ratio of fine pores having a fine pore diameter of greater than 0.1 to 1 μm in a catalyst layer formed on a substrate.

Example 1

A cerium-zirconium composite oxide particle having an average particle diameter of 30 μn was used as a first compound. The particle was impregnated with dinitroamine Pt to prepare a cerium-zirconium composite oxide particle carrying 0.85% Pt (hereinafter referred to as "cerium-zirconium composite oxide particle A").

118.42 g (containing 24% moisture) of acicular boehmite (10 nmφ×100 nm) was charged into a beaker, followed by dispersion in water and deflocculation with an acid. Then, 90 g of the previously prepared cerium-zirconium composite oxide particle A was further charged thereto and dispersed by stirring at high speed, thereby obtaining a slurry of the particle A. The slurry was dried and fired to prepare Powder a-1 comprising the cerium-zirconium composite oxide particle A coated with alumina.

Then, a ball mill was charged with 168 g of Powder a-1, 7 g of boehmite alumina and 9.21 g of activated carbon powder. Powder a-1 was pulverized after supplying 307.5 g of water and 17.5 g of 10% nitric acid solution to the ball mill, thereby obtaining a slurry having an average particle diameter of 3 μm (Slurry a-1).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 9.21 g of activated carbon powder, followed by pulverization with 307.5 g of water and 17.5 g of 10% nitric acid solution supplied to the ball mill, thereby obtaining a slurry having an average particle diameter of 3 μm (Slurry b-1).

Slurry a-1 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Thereafter, Slurry b-1 was coated on this catalyst layer, followed by drying and firing, thereby forming a catalyst layer having a weight of 60 g per one liter of the substrate. As a result, a catalyst sample of Example 1 was prepared. Example 1 contains 0.5712 g/L of Pt and 0.2344 g/L of Rh in the catalyst layers, respectively.

Example 2

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

118.42 g (containing 24% moisture) of acicular boehmite (10 nmφ×100 nm) was charged into a beaker, followed by dispersion in water and deflocculation with an acid. Then, 90 g of the previously prepared cerium-zirconium composite oxide particle A was further charged thereto and dispersed by stirring at a high speed, thereby obtaining a slurry of the particle A. The slurry was dried and fired to prepare Powder a-1 comprising the cerium-zirconium composite oxide particle A coated with alumina.

Then, a ball mill was charged with 168 g of Powder a-1, 7 g of boehmite alumina and 19.44 g of activated carbon powder, Powder a-1 was pulverized after supplying 307.5 g of water and 17.5 g of 10% nitric acid solution to the ball mill, thereby obtaining a slurry having an average particle diameter of 3 μm (Slurry a-2).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 19.44 g of activated carbon powder, followed by pulverization with 307.5 g of water and 17.5 g of 10% nitric acid solution supplied to the ball mill, thereby obtaining a slurry having an average particle diameter of 3 μm (Slurry b-2).

Slurry a-2 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-2 was coated on this catalyst layer, followed by drying and firing, thereby forming a catalyst layer having a weight of 60 g per one liter of the substrate. As a result, a catalyst sample of Example 2 was prepared. Example 2 contains 0.5712 g/L of Pt and 0.2344 g/L of Rh in the catalyst layers, respectively.

Example 3

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

118.42 g (containing 24% moisture) of acicular boehmite (10 nmφ×100 nm) was charged into a beaker, followed by dispersion in water and deflocculation with an acid. Then, 90 g of the previously prepared cerium-zirconium composite oxide particle A was further charged thereto and dispersed by stirring at a high speed, thereby obtaining a slurry of the particle A. The slurry was dried and fired to prepare Powder a-1 comprising the cerium-zirconium composite oxide particle A coated with alumina.

Thereafter, a ball mill was charged with 168 g of Powder a-1, 7 g of boehmite alumina and 33.33 g of activated carbon powder. Powder a-1 was pulverized after supplying 307.5 g of water and 17.5 g of 10% nitric acid solution to the ball mill, thereby obtaining a slurry having an average particle diameter of 3 μm (Slurry a-3).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 33.3 g of activated carbon powder, followed by pulverization with 307.5 g of water and 17.5 g of 10% nitric acid solution supplied to the ball mill, thereby obtaining a slurry having an average particle diameter of 3 μm (Slurry b-3).

Slurry a-3 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-3 was coated on this catalyst layer, followed by drying and firing, thereby forming a catalyst layer having a weight of 60 g per one liter of the substrate. As a result, a catalyst sample of Example 3 was prepared. Example 3 contains 0.5712 g/L of Pt and 0.2344 g/L of Rh in the catalyst layers, respectively.

Example 4

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

118.42 g (containing 24% moisture) of acicular boehmite (10 nmφ×100 nm) was charged into a beaker, followed by dispersion in water and deflocculation with an acid. Then, 90 g of the previously prepared cerium-zirconium composite oxide particle A was further charged thereto and dispersed by stirring at a high speed, thereby obtaining a slurry of the particle A. The slurry was dried and fired to prepare Powder a-1 comprising the cerium-zirconium composite oxide particle A coated with alumina.

Then, a ball mill was charged with 168 g of Powder a-1, 7 g of boehmite alumina and 46.51 g of activated carbon powder. Powder a-1 was pulverized after supplying 307.5 g of water and 17.5 g of 10% nitric acid solution to the ball mill, thereby obtaining a slurry having an average particle diameter of 3 μm (Slurry a-4).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 46.51 g of activated carbon powder, followed by pulverization with 307.5 g of water and 17.5 g of 10% nitric acid solution supplied to the ball mill, thereby obtaining a slurry having an average particle diameter of 3 μm (Slurry b-4).

Slurry a-4 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-4 was coated on this catalyst layer, followed by drying and firing, thereby forming a catalyst layer having a weight of 60 g per one liter of the substrate. As a result, a catalyst sample of Example 4 was prepared. Example 4 contains 0.5712 g/L of Pt and 0.2344 g/L of Rh in the catalyst layers, respectively.

Example 5

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

118.42 g (containing 24% moisture) of acicular boehmite (10 nmφ×100 nm) was charged into a beaker, followed by dispersion in water and deflocculation with an acid. Then, 90 g of the previously prepared cerium-zirconium composite oxide particle A was further charged thereto and dispersed by stirring at a high speed, thereby obtaining a slurry of the particle A. The slurry was dried and fired to prepare Powder a-1 comprising the cerium-zirconium composite oxide particle A coated with alumina.

Then, a ball mill was charged with 168 g of Powder a-1, 7 g of boehmite alumina and 61.48 g of activated carbon powder. Powder a-1 was pulverized after supplying 307.5 g of water and 17.5 g of 10% nitric acid solution to the ball mill, thereby obtaining a slurry having an average particle diameter of 3 μm (Slurry a-5).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 61.48 g of activated carbon powder, followed by pulverization with 307.5 g of water and 17.5 g of 10% nitric acid solution supplied to the ball mill, thereby obtaining a slurry having an average particle diameter of 3 μm (Slurry b-5).

Slurry a-5 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-5 was coated on this catalyst layer, followed by drying and firing, thereby forming a catalyst layer having a weight of 60 g per one liter of the substrate. As a result, a catalyst sample of Example 5 was prepared. Example 5 contains 0.5712 g/L of Pt and 0.2344 g/L of Rh in the catalyst layers, respectively.

Example 6

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

118.42 g (containing 24% moisture) of acicular boehmite (10 nmφ×100 nm) was charged into a beaker, followed by dispersion in water and deflocculation with an acid. Then, 90 g of the previously prepared cerium-zirconium composite oxide particle A was further charged thereto and dispersed by stirring at a high speed, thereby obtaining a slurry of the particle A. The slurry was dried and fired to prepare Powder a-1 comprising the cerium-zirconium composite oxide particle A coated with alumina.

Then, a ball mill was charged with 168 g of Powder a-1, 7 g of boehmite alumina and 75 g of activated carbon powder. Powder a-1 was pulverized after supplying 307.5 g of water and 17.5 g of 10% nitric acid solution to the ball mill, thereby obtaining a slurry having an average particle diameter of 3 μm (Slurry a-6).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 75 g of activated carbon powder, followed by pulverization with 307.5 g of water and 17.5 g of 10% nitric acid solution supplied to the ball mill, thereby obtaining a slurry having an average particle diameter of 3 μm (Slurry b-6).

Slurry a-6 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-6 was coated on this catalyst layer, followed by drying and firing, thus forming a catalyst layer having a weight of 60 g per one liter of the substrate. As a result, a catalyst sample of Example 6 was prepared. Example 6 contains 0.5712 g/L of Pt and 0.2344 g/L of Rh in the catalyst layers, respectively.

Example 7

A cerium-zirconium composite oxide particle having an average particle diameter of 30 nm was used as a first compound. The particle was impregnated with dinitroamine Pd to prepare a cerium-zirconium composite oxide particle carrying 0.85% Pd (hereinafter referred to as "cerium-zirconium composite oxide particle A2").

118.42 g (containing 24% moisture) of acicular boebmite (10 nmφ×100 nm) was charged into a beaker, followed by dispersion in water and deflocculation with an acid. Then, 90 g of the previously prepared cerium-zirconium composite oxide particle A2 was further charged thereto and dispersed by stirring at a high speed, thereby obtaining a slurry of the particle A2. The slurry was dried and fired to prepare Powder a-2 comprising the cerium-zirconium composite oxide particle A2 coated with alumina.

Then, a ball mill was charged with 168 g of Powder a-2, 7 g of boehmite alumina and 33.3 g of activated carbon powder. Powder a-2 was pulverized after supplying 307.5 g of water and 17.5 g of 10% nitric acid solution to the ball mill, thereby obtaining a slurry having an average particle diameter of 3 μm (Slurry a-7).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 33.3 g of activated carbon powder, followed by pulverization with 307.5 g of water and 17.5 g of 10% nitric acid solution supplied to the ball mill, thereby obtaining a slurry having an average particle diameter of 3 μm (Slurry b-7).

Slurry a-7 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-7 was coated on this catalyst layer, followed by drying and firing, thereby forming a catalyst layer having a weight of 60 g per one liter of the substrate. As a result, a catalyst sample of Example 7 was prepared. Example 7 contains 0.5712 g/L of Pd and 0.2344 g/L of Rh in the catalyst layers, respectively.

Example 8

A cerium-zirconium composite oxide particle having an average particle diameter of 30 nm was used as a first compound. The particle was impregnated with dinitroamine Pd to prepare a cerium-zirconium composite oxide particle carrying 0.85% Pd (hereinafter referred to as "cerium-zirconium composite oxide particle A2").

118.42 g (containing 24% moisture) of acicular boehmite (10 nmφ×100 nm) was charged into a beaker, followed by dispersion in water and deflocculation with an acid. Then, 90 g of the previously prepared cerium-zirconium composite oxide particle A2 was further charged thereto and dispersed by stirring at a high speed, thereby obtaining a slurry. The slurry was dried and fired to prepare Powder a-2 comprising the cerium-zirconium composite oxide particle A2 coated with alumina.

Thereafter, a ball mill was charged with 168 g of Powder a-2, 7 g of boehmite alumina and 46.51 g of activated carbon powder. Powder a-2 was pulverized after supplying 307.5 g of water and 17.5 g of 10% nitric acid solution to the ball mill, thereby obtaining a slurry having an average particle diameter of 3 μm (Slurry a-8).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 46.51 g of activated carbon powder, followed by pulverization with 307.5 g of water and 17.5 g of 10% nitric acid solution supplied to the ball mill, thereby obtaining a slurry having an average particle diameter of 3 μm (Slurry b-8).

Slurry a-8 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-8 was coated on this catalyst layer, followed by drying and firing, thereby forming a catalyst layer having a weight of 60 g per one liter of the substrate. As a result, a catalyst sample of Example 8 was prepared. Example 8 contains 0.5712 g/L of Pd and 0.2344 g/l of Rh in the catalyst layers, respectively.

Examples 9 to 14 are different from one another in view of the fine pore volume in the catalyst powder.

Example 9

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

118.42 g (containing 24% moisture) of acicular boehmite (10 nmφ×100 nm) was charged into a beaker, followed by dispersion in water and deflocculation with an acid. Then, 90 g of the previously prepared cerium-zirconium composite oxide particle A was further charged thereto and dispersed by stirring at a high speed, thereby obtaining a slurry of the particle A. The slurry was dried and fired to prepare Powder a-1 comprising the cerium-zirconium composite oxide particle A coated with alumina.

Thereafter, a ball mill was charged with 168 g of Powder a-1, 7 g of boehmite alumina and 52.27 g of activated carbon powder. Powder a-1 was pulverized after supplying 307.5 g of water and 17.5 g of 10% nitric acid solution to the ball mill, thereby obtaining a slurry having an average particle diameter of 3 μm (Slurry a-11).

Next, a zirconium-lanthanum composite oxide particle having an average particle diameter of 20 nm was impregnated with rhodium nitrate, thereby preparing Particle B carrying 0.814% rhodium. 118.42 g of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-11).

Slurry a-11 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-11 was coated on this catalyst layer, followed by drying and firing, thereby forming a catalyst layer having a weight of 60 g per one liter of the substrate. As a result, a catalyst sample of Example 9 was prepared. Example 9 contains 0.5712 g/L of Pt and 0.2344 g/L of Rh in the catalyst layers, respectively.

Example 10

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

113.92 g (containing 21% moisture) of plate boehmite (20×20×10 nm) was charged into a beaker, followed by dispersion in water and deflocculation with an acid. Then, 90 g of the previously prepared cerium-zirconium composite oxide particle A was farther charged thereto and dispersed by stirring at a high speed, thereby obtaining a slurry of the particle A. The slurry was dried and fired to prepare Powder a-4 comprising the cerium-zirconium composite oxide particle A coated with alumina.

Then, a ball mill was charged with 168 g of Powder a-4, 7 g of boehmite alumina and 52.27 g of activated carbon powder. Powder a-4 was pulverized after supplying 307.5 g of water and 17.5 g of 10% nitric acid solution to the ball mill, thereby obtaining a slurry having an average particle diameter of 3 μm (Slurry a-12).

Next, a zirconium-lanthanum composite oxide particle having an average particle diameter of 20 nm was impregnated with rhodium nitrate, thereby preparing Particle B carrying 0.814% rhodium. 113.92 g of plate boehrnite (containing 21% moisture) was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-3 comprising Particle B coated with alumina.

Thereafter, a ball mill was charged with 168 g of Powder b-3, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-12).

Slurry a-12 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-12 was coated on this catalyst layer, followed by drying and firing, thereby forming a catalyst layer having a weight of 60 g per one liter of the substrate. As a result, a catalyst sample of Example 10 was prepared. Example 10 contains 0.5712 g/L of Pt and 0.2344 g/L of Rh in the catalyst layers, respectively.

Example 11

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

105.88 g (containing 15% moisture) of cubic boehmite (20×20×20 nm) was charged into a beaker, followed by dispersion in water and deflocculation with an acid. Then, 90 g of the previously prepared cerium-zirconium composite oxide particle A was further charged thereto and dispersed by stirring at a high speed, thereby obtaining a slurry of the particle A. The slurry was dried and fired to prepare Powder a-5 comprising the cerium-zirconium composite oxide particle A coated with alumina.

Then, a ball mill was charged with 168 g of Powder a-5, 7 g of boehmite alumina and 52.27 g of activated carbon powder. Powder a-4 was pulverized after supplying 307.5 g of water and 17.5 g of 10% nitric acid solution to the ball mill, thereby obtaining a slurry having an average particle diameter of 3 μm (Slurry a-13).

Next, a zirconium-lanthanum composite oxide particle having an average particle diameter of 20 nm was impregnated with rhodium nitrate, thereby preparing Particle B carrying 0.814% rhodium. 105.88 g (containing 15% moisture) of cubic boehmite was charged into a beaker, followed by dispersion in water and deflocculation with an acid. Then, 90 g of the previously prepared particle B was farther charged thereto and dispersed by stirring at a high speed, thereby obtaining a slurry of Particle B. The slurry was dried and fired to prepare Powder b-4 comprising Particle B coated with alumina.

Thereafter, a ball mill was charged with 168 g of Powder b-4, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-13).

Slurry a-13 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-13 was coated on this catalyst layer, followed by drying and firing, thereby forming a catalyst layer having a weight of 60 g per one liter of the substrate. As a result, a catalyst sample of Example 11 was prepared. Example 11 contains 0.5712 g/L of Pt and 0.2344 g/L of Rh in the catalyst layers, respectively.

Example 12

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

102.27 g (containing 12% moisture) of prism-shaped boehmite (20×20×60 nm) was charged into a beaker, followed by dispersion in water and deflocculation with an acid. Then, 90 g of the previously prepared cerium-zirconium composite oxide particle A was further charged thereto and dispersed by stirring at a high speed, thereby obtaining a slurry of the particle A. The slurry was dried and fired to prepare Powder a-6 comprising the cerium-zirconium composite oxide particle A coated with alumina.

Thereafter, a ball mill was charged with 168 g of Powder a-6, 7 g of boehmite alumina and 52.27 g of activated carbon powder. Powder a-6 was pulverized after supplying 307.5 g of water and 17.5 g of 10% nitric acid solution to the ball mill, thereby obtaining a slurry having an average particle diameter of 3 μm (Slurry a-14).

Next, a zirconium-lanthanum composite oxide particle having an average particle diameter of 20 nm was impregnated with rhodium nitrate, thereby preparing Particle B carrying 0.814% rhodium. 102.27 g of prism-shaped boelnite (containing 12% moisture) was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-5 comprising Particle B coated with alumina.

Then, a ball mill was charged with 168 g of Powder b-5, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-14).

Slurry a-14 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-14 was coated on this catalyst layer, followed by drying and firing, thereby forming a catalyst layer having a weight of 60 g per one liter of the substrate. As a result, a catalyst sample of Example 12 was prepared. Example 12 contains 0.5712 g/L of Pt and 0.2344 g/L of Rh in the catalyst layers, respectively.

Example 13

A cerium-zirconium composite oxide particle having an average particle diameter of 30 nm was used as a first compound. The particle was impregnated with dinitroamine Pd to prepare a cerium-zirconium composite oxide particle carrying 0.85% Pd (hereinafter referred to as "cerium-zirconium composite oxide particle A2").

113.92 g (containing 21% moisture) of plate boehmite (20×20×10 nm) was charged into a beaker, followed by dispersion in water and acidification. Then, 90 g of the previously prepared cerium-zirconium composite oxide particle A2 was further charged thereto and dispersed by stirring at a high speed, thereby obtaining a slurry of the particle A2. The slurry was dried and fired to prepare Powder a-7 comprising the cerium-zirconium composite oxide particle A2 coated with alumina.

Then, a ball mill was charged with 168 g of Powder a-7, 7 g of boehmite alumina and 52.27 g of activated carbon powder. Powder a-7 was pulverized after supplying 307.5 g of water and 17.5 g of 10% nitric acid solution to the ball mill, thereby obtaining a slurry having an average particle diameter of 3 μm (Slurry a-15).

Next, a zirconium-lanthanum composite oxide particle having an average particle diameter of 20 nm was impregnated with rhodium nitrate, thereby preparing Particle B carrying 0.814% rhodium. 113.92 g (containing 21% moisture) of plate boehmite (20×20×10 nm) was charged into a beaker, followed by dispersion in water and acidification. Then, 90 g of the previously prepared particle B was further charged thereto and dispersed by stirring at a high speed, thereby obtaining a slurry of Particle B. The slurry was dried and fired to prepare Powder b-3 comprising Particle B coated with alumina.

Then, a ball mill was charged with 168 g of Powder b-3, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-12).

Slurry a-15 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-12 was coated on this catalyst layer, followed by drying and firing, thereby forming a catalyst layer having a weight of 60 g per one liter of the substrate. As a result, a catalyst sample of Example 13 was prepared. Example 13 contains 0.5712 g/L of Pd and 0.2344 g/L of Rh in the catalyst layers, respectively.

Example 14

A cerium-zirconium composite oxide particle having an average particle diameter of 30 nm was used as a first compound. The particle was impregnated with dinitroamine Pd to prepare a cerium-zirconium composite oxide particle carrying 0.85% Pd (hereinafter referred to as "cerium-zirconium composite oxide particle A2").

105.88 g (containing 15% moisture) of cubic boehmite (20×20×20 nm) was charged into a beaker, followed by dispersion in water and deflocculation with an acid. Then, 90 g of the previously prepared cerium-zirconium composite oxide particle A2 was further charged thereto and dispersed by stirring at a high speed, thereby obtaining a slurry of the particle A2. The slurry was dried and fired to prepare Powder a-8 comprising the cerium-zirconium composite oxide particle A2 coated with alumina.

Thereafter, a ball mill was charged with 168 g of Powder a-8, 7 g of boehmite alumina and 52.27 g of activated carbon powder. Powder a-5 was pulverized after supplying 307.5 g of water and 17.5 g of 10% nitric acid solution to the ball mill, thereby obtaining a slurry having an average particle diameter of 3 μm (Slurry a-16).

Next, a zirconium-lanthanum composite oxide particle having an average particle diameter of 20 nm was impregnated with rhodium nitrate, thereby preparing Particle B carrying 0.814% rhodium. 105.88 g (containing 15% moisture) of cubic boehmite (20×20×20 nm) was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-4 comprising Particle B coated with alumina.

Thereafter, a ball mill was charged with 168 g of Powder b-4, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-13).

Slurry a-16 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-13 was coated on this catalyst layer, followed by drying and firing, thereby forming a catalyst layer having a weight of 60 g per one liter of the substrate. As a result, a catalyst sample of Example 14 was prepared. Example 14 contains 0.5712 g/L of Pd and 0.2344 g/L of Rh in the catalyst layers, respectively.

Examples 15 to 17 comprise $CeO_2$ and $ZrO_2$ as the first compound and have different contents of $CeO_2$ and $ZrO_2$ from one another.

Example 15

A cerium-zirconium composite oxide particle consisting of 70% cerium and 30% zirconium was used as a first compound. The particle was impregnated with dinitroamine Pt to prepare a cerium-zirconium composite oxide particle carrying 0.85% Pt (hereinafter referred to as "cerium-zirconium composite oxide particle A3").

105.88 g (containing 15% moisture) of cubic boehmite (20×20×20 nm) was charged into a beaker, followed by dispersion in water and deflocculation with an acid. Then, 90 g of the previously prepared particle A3 was further charged thereto and dispersed by stirring at a high speed, thereby obtaining a slurry of the particle A3. The slurry was dried and fired to prepare Powder a-11 comprising the particle A3 coated with alumina.

Then, a ball mill was charged with 168 g of Powder a-11, 7 g of boehmite alumina and 52.27 g of activated carbon powder. Powder a-11 was pulverized after supplying 307.5 g of water and 17.5 g of 10% nitric acid solution to the ball mill, thereby obtaining a slurry having an average particle diameter of 3 μm (Slurry a-19).

Next, a zirconium-lanthanum composite oxide particle consisting of 90% zirconium and 10% lanthanum was impregnated with rhodium nitrate, thereby preparing Particle B2 carrying 0.814% rhodium. 105.88 g (containing 15% moisture) of cubic boehmite (20×20×20 nm) was charged into a beaker, followed by dispersion in water and deflocculation with an acid. Then, 90 g of the previously prepared particle B2 was further charged thereto and dispersed by stirring at a high speed, thereby obtaining a slurry of Particle B2. The slurry was dried and fired to prepare Powder b-8, which comprises Particle B2 coated with alumina.

Thereafter, a ball mill was charged with 168 g of Powder b-8, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-17).

Slurry a-19 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-17 was coated on this catalyst layer, followed by drying and firing, thereby forming a catalyst layer having a weight of 60 g per one liter of the substrate. As a result, a catalyst sample of Example 15 was prepared. Example 15 contains 0.5712 g/L of Pt and 0.2344 g/L of Rh in the catalyst layers, respectively.

Example 16

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

105.88 g (containing 15% moisture) of cubic boehmite (20×20×20 nm) was charged into a beaker, followed by dispersion in water and deflocculation with an acid. Then, 90 g of the previously prepared particle A4 was further charged thereto and dispersed by stirring at a high speed, thereby obtaining a slurry of the particle A4. The slurry was dried and fired to prepare Powder a-12 comprising the particle A4 coated with alumina.

Then, a ball mill was charged with 168 g of Powder a-12, 7 g of boehmite alumina, and 52.27 g of activated carbon powder. Powder a-12 was pulverized after supplying 307.5 g of water and 17.5 g of 10% nitric acid solution to the ball mill, thereby obtaining a slurry having an average particle diameter of 3 μm (Slurry a-20).

Next, a zirconium-lanthanum composite oxide particle consisting of 95 wt % zirconium and 5 wt % lanthanum was impregnated with rhodium nitrate, thereby preparing Particle B3 carrying 0.814% rhodium. 105.88 g (containing 15% moisture) of cubic boehmite (20×20×20 nm) was charged into a beaker, followed by dispersion in water and deflocculation with an acid. Then, 90 g of the previously prepared particle B3 was further charged thereto and dispersed by stirring at a high speed, thereby obtaining a slurry of Particle B3. The slurry was dried and fired to prepare Powder b-9 comprising Particle B3 coated with alumina.

Thereafter, a ball mill was charged with 168 g of Powder b-9, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-18).

Slurry a-20 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-18 was coated on this catalyst layer, followed by drying and firing, thereby forming a catalyst layer having a weight of 60 g per one liter of the substrate. As a result, a catalyst sample of Example 16 was prepared. Example 16 contains 0.5712 g/L of Pt and 0.2344 g/L of Rh in the catalyst layers, respectively.

Example 17

A cerium-zirconium composite oxide particle consisting of 85% cerium and 15% zirconium was used as a first compound. The particle was impregnated with dinitroamine Pt to prepare a cerium-zirconium composite oxide particle comprising 0.85% Pt (hereinafter referred to as "cerium-zirconium composite oxide particle A5").

105.88 g (containing 15% moisture) of cubic boehmite (20×20×20 nm) was charged into a beaker, followed by dispersion in water and deflocculation with an acid. Then, 90 g of the previously prepared particle A5 was further charged thereto and dispersed by stirring at a high speed, thereby obtaining a slurry of the particle A5. The slurry was dried and fired to prepare Powder a-13 comprising the particle A5 coated with alumina.

Thereafter, a ball mill was charged with 168 g of Powder a-13, 7 g of boehmite alumina and 52.27 g of activated carbon powder. Powder a-12 was pulverized after supplying 307.5 g of water and 17.5 g of 10% nitric acid solution to the ball mill, thereby obtaining a slurry having an average particle diameter of 3 μm (Slurry a-21).

Next, a zirconium-lanthanum composite oxide particle consisting of 99% zirconium and 1% lanthanum was impregnated with rhodium nitrate, thereby preparing Particle B4 carrying 0.814% rhodium. 105.88 g (containing 15% moisture) of cubic boehmite (20×20×20 nm) was charged into a beaker, followed by dispersion in water and deflocculation with an acid. Then, 90 g of the previously prepared particle B4 was further charged thereto and dispersed by stirring at a high speed, thereby obtaining a slurry of Particle B4. The slurry was dried and fired to prepare Powder b-10 comprising Particle B4 coated with alumina.

Then, a ball mill was charged with 168 g of Powder b-10, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-19).

Slurry a-21 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-19 was coated on this catalyst layer, followed by drying and firing, thereby forming a catalyst layer having a weight of 60 g per one liter of the substrate. As a result, a catalyst sample of Example 17 was prepared. Example 17 contains 0.5712 g/L of Pt and 0.2344 g/L of Rh in the catalyst layers, respectively.

Examples 18 to 20 contain alumina comprising $CeO_2$ and $ZrO_2$ as a second compound and have different contents of $CeO_2$ and $ZrO_2$ from one another.

Example 18

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

With 101.46 g (containing 24.6% moisture) of acicular boehmite (10 nmφ×100 nm) charged into a beaker containing water, 4.5 g of cerium nitrate for cerium oxide and 9 g of zirconyl nitrate for zirconium oxide were charged thereto and dispersed in water. Then, 90 g of the previously prepared cerium-zirconium composite oxide particle A was further charged thereto and dispersed by stirring at a high speed, thereby obtaining a slurry of the particle A. The slurry was dried and fired to prepare Powder a-16 comprising the cerium-zirconium composite oxide particle A coated with alumina.

Thereafter, a ball mill was charged with 168 g of Powder a-16, 7 g of boehmite alumina and 52.27 g of activated carbon powder. Powder a-16 was pulverized after supplying 307.5 g of water and 17.5 g of 10% nitric acid solution to the ball mill, thereby obtaining a slurry having an average particle diameter of 3 μm (Slurry a-24).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-11).

Slurry a-24 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-11 was coated on this catalyst layer, followed by drying and firing, thereby forming a catalyst layer having a weight of 60 g per one liter of the substrate. As a result, a catalyst sample of Example 18 was prepared.

Example 18 contains 0.5712 g/L of Pt and 0.2344 g/L of Rh in the catalyst layers, respectively.

Example 19

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

With 101.46 g (containing 24.6% moisture) of acicular boehmite (10 nmφ×100 nm) charged into a beaker containing water, 9 g of cerium nitrate for cerium oxide and 4.5 g of zirconyl nitrate for zirconium oxide were charged thereto and dispersed in water. Then, 90 g of the previously prepared cerium-zirconium composite oxide particle A was further charged thereto and dispersed by stirring at a high speed, thereby obtaining a slurry of the particle A. The slurry was dried and fired to prepare Powder a-17 comprising the cerium-zirconium composite oxide particle A coated with alumina.

Then, a ball mill was charged with 168 g of Powder a-17, 7 g of boehmite alumina and 52.27 g of activated carbon powder. Powder a-17 was pulverized after supplying 307.5 g of water and 17.5 g of 10% nitric acid solution to the ball mill, thereby obtaining a slurry having an average particle diameter of 3 μm (Slurry a-25).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina, and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-11).

Slurry a-25 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-11 was coated on this catalyst layer, followed by drying and firing, thereby forming a catalyst layer having a weight of 60 g per one liter of the substrate. As a result, a catalyst sample of Example 19 was prepared. Example 19 contains 0.5712 g/L of Pt and 0.2344 g/L of Rh in the catalyst layers, respectively.

Example 20

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

With 111.14 g (containing 24.6% moisture) of acicular boehmite (10 nmφ×100 nm) charged into a beaker containing water, 13.5 g of cerium nitrate for cerium oxide and 2.7 g of zirconyl nitrate for zirconium oxide were charged thereto and dispersed in water. Then, 90 g of the previously prepared cerium-zirconium composite oxide particle A was further charged thereto and dispersed by stirring at a high speed, thereby obtaining a slurry of the particle A. The slurry was dried and fired to prepare Powder a-18 comprising the cerium-zirconium composite oxide particle A coated with alumina.

Then, a ball mill was charged with 168 g of Powder a-18, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry a-26).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-11).

Slurry a-26 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-11 was coated on this catalyst layer, followed by drying and firing, thereby forming a catalyst layer having a weight of 60 g per one liter of the substrate. As a result, a catalyst sample of Example 20 was prepared. Example 20 contains 0.5712 g/L of Pt and 0.2344 g/L of Rh in the catalyst layers, respectively.

Examples 21 to 23 contain alumina comprising $La_2O_3$ as a second compound and have different contents of $La_2O_3$ from one another.

Example 21

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

With 115.78 g (containing 24.6% moisture) of acicular boehmite (10 nmφ×100 nm) charged into a beaker containing water, 2.7 g of lanthanum nitrate for lanthanum oxide was charged and dispersed in water. Then, 90 g of the previously prepared cerium-zirconium composite oxide particle A was further charged thereto and dispersed by stirring at a high speed, thereby obtaining a slurry of the particle A. The slurry was dried and fired to prepare Powder a-21 comprising the cerium-zirconium composite oxide particle A coated with alumina.

Then, a ball mill was charged with 168 g of Powder a-21, 7 g of boehmite alumina and 52.27 g of activated carbon powder. Powder a-21 was pulverized after supplying 307.5 g of water and 17.5 g of 10% nitric acid solution to the ball mill, thereby obtaining a slurry having an average particle diameter of 3 μm (Slurry a-29).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-11).

Slurry a-29 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-11 was coated on this catalyst layer, followed by drying and firing, thereby forming a catalyst layer having a weight of 60 g per one liter of the substrate. As a result, a catalyst sample of Example 21 was prepared. Example 21 contains 0.5712 g/L of Pt and 0.2344 g/L of Rh in the catalyst layers, respectively.

Example 22

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

With 113.40 g (containing 24.6% moisture) of acicular boehmite (10 nmφ×100 nm) charged into a beaker containing water, 4.5 g of lanthanum nitrate for lanthanum oxide was charged and dispersed in water. Then, 90 g of the previously prepared cerium-zirconium composite oxide particle A was further charged thereto and dispersed by stirring at a high speed, thereby obtaining a slurry of the particle A. The slurry was dried and fired to prepare Powder a-22 comprising the cerium-zirconium composite oxide particle A coated with alumina.

Then, a ball mill was charged with 168 g of Powder a-22, 7 g of boehmite alumina and 52.27 g of activated carbon powder. Powder a-22 was pulverized after supplying 307.5 g of water and 17.5 g of 10% nitric acid solution to the ball mill, thereby obtaining a slurry having an average particle diameter of 3 μm (Slurry a-30).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boelnite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-11).

Slurry a-30 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-11 was coated on this catalyst layer, followed by drying and firing, thereby forming a catalyst layer having a weight of 60 g per one liter of the substrate. As a result, a catalyst sample of Example 22 was prepared. Example 22 contains 0.5712 g/L of Pt and 0.2344 g/L of Rh in the catalyst layers, respectively.

Example 23

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

With 107.43 g (containing 24.6% moisture) of acicular boehmlite (10 nmφ×100 nm) charged into a beaker containing water, 9 g of lanthanum nitrate for lanthanum oxide was charged and dispersed in water. Then, 90 g of the previously prepared cerium-zirconium composite oxide particle A was further charged thereto and dispersed by stirring at a high speed, thereby obtaining a slurry of the particle A. The slurry was dried and fired to prepare Powder a-23 comprising the cerium-zirconium composite oxide particle A coated with alumina.

Thereafter, a ball mill was charged with 168 g of Powder a-23, 7 g of boehmite alumina and 52.27 g of activated carbon powder. Powder a-23 was pulverized after supplying 307.5 g of water and 17.5 g of 10% nitric acid solution to the ball mill, thereby obtaining a slurry having an average particle diameter of 3 μm (Slurry a-31).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 52.27 g of activated carbon powder, followed by pulverization with 307.5 g of water and 17.5 g of 10% nitric acid solution supplied to the ball mill, thereby obtaining a slurry having an average particle diameter of 3 μm (Slurry b-11).

Slurry a-31 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-11 was coated on this catalyst layer, followed by drying and firing, thereby forming a catalyst layer having a weight of 60 g per one liter of the substrate. As a result, a catalyst sample of Example 23 was prepared.

Example 23 contains 0.5712 g/L of Pt and 0.2344 g/L of Rh in the catalyst layers, respectively.

Examples 24 to 27 have an underlayer and contain alumina comprising $CeO_2$ and $ZrO_2$ as a second compound of an interlayer catalyst.

Example 24

A ball mill was charged with 180 g of γ-alumina powder and 20 g of boehmite alumina, followed by pulverization with 282.5 g of water and 17.5 g of 10% nitric acid solution supplied to the ball mill, thereby obtaining a slurry having an average particle diameter of 3 μm (Slurry c-1).

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

With 101.46 g (containing 24.6% moisture) of acicular boehmite (10 nmφ×100 nm) charged into a beaker containing water, 9 g of cerium nitrate for cerium oxide and 4.5 g of zirconyl nitrate for zirconium oxide were charged thereto and dispersed in water. Then, 90 g of the previously prepared cerium-zirconium composite oxide particle A4 was further charged thereto and dispersed by stirring at a high speed, thereby obtaining a slurry of the particle A4. The slurry was dried and fired to prepare Powder a-26 comprising the cerium-zirconium composite oxide particle A4 coated with alumina.

Then, a ball mill was charged with 168 g of Powder a-26, 7 g of boehmite alumina and 38.41 g of activated carbon powder. Powder a-26 was pulverized after supplying 307.5 g of water and 17.5 g of 10% nitric acid solution to the ball mill, thereby obtaining a slurry having an average particle diameter of 3 μm (Slurry a-34).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehlnite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-31).

Slurry c-1 was coated on a honeycomb type substrate (volume: 0.04 liters) having a diameter of 36φ, 400 cells and 6 mils, followed by drying and firing, thereby forming an alumina layer having a weight of 50 g per one liter of the substrate. Then, Slurry a-34 was coated on the alumina layer, followed by drying and firing, thereby forming a catalyst layer having a weight of 140 g per one liter of the substrate. Next, Slurry b-31 was coated on the catalyst layer, followed by drying and firing, thereby forming a catalyst layer having a weight of 60 g per one liter of the substrate. As a result, a catalyst sample of Example 24 was prepared. Example 24 contains 0.5712 g/L of Pt and 0.2344 g/L of Rh in the catalyst layers, respectively.

Example 25

A ball mill was charged with 180 g of β-zeolite, 288 g of silica-sol ($SiO_2$: 15%) and 32 g of water, followed by pulverization, thereby obtaining a slurry having an average particle diameter of 3 μm (Slurry d-1).

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

With 101.46 g (containing 24.6% moisture) of acicular boehmite (10 nmφ×100 nm) charged into a beaker containing water, 9 g of cerium nitrate for cerium oxide and 4.5 g of zirconyl nitrate for zirconium oxide were charged thereto and dispersed in water. Then, 90 g of the previously prepared cerium-zirconium composite oxide particle A4 was further charged thereto and dispersed by stirring at a high speed, thereby obtaining a slurry of the particle A4. The slurry was dried and fired to prepare Powder a-26 comprising the cerium-zirconium composite oxide particle A4 coated with alumina.

Then, a ball mill was charged with 168 g of Powder a-26, 7 g of boehmite alumina and 38.41 g of activated carbon powder. Powder a-26 was pulverized after supplying 307.5 g of water and 17.5 g of 10% nitric acid solution to the ball mill, thereby obtaining a slurry having an average particle diameter of 3 μm (Slurry a-34).

Next, a zirconium-lanthanum composite oxide particle having an average particle diameter of 20 nm was impregnated with rhodium nitrate, thereby preparing Particle B carrying 0.14% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-31).

Slurry d-1 was coated on a honeycomb type substrate (volume: 0.04 liters) having a diameter of 36φ, 400 cells and 6 mils, followed by drying and firing, thereby forming a β-zeolite layer having a weight of 50 g per one liter of the substrate. Then, Slurry a-34 was coated on the β-zeolite layer, followed by drying and firing, thereby forming a catalyst layer having a weight of 140 g per one liter of the substrate. Next, Slurry b-31 was coated on the catalyst layer, followed by drying and firing, thereby forming a catalyst layer having a weight of 60 g per one liter of the substrate. As a result, a catalyst sample of Example 25 was prepared. Example 25 contains 0.5712 g/L of Pt and 0.2344 g/L of Rh in the catalyst layers, respectively.

Example 26

A ball mill was charged with 180 g of γ-alumina powder and 20 g of boehmite alumina, followed by pulverization with 282.5 g of water and 17.5 g of 10% nitric acid solution supplied to the ball mill, thereby obtaining a slurry having an average particle diameter of 3 μm (Slurry c-1).

A cerium-zirconium composite oxide particle consisting of 78% cerium and 22% zirconium was used as a first compound. The particle was impregnated with dinitroamine Pd to prepare a cerium-zirconium composite oxide particle carrying 0.85% Pd (hereinafter referred to as "cerium-zirconium composite oxide particle A8").

With 101.46 g (containing 24.6% moisture) of acicular boehmite (10 nmφ×100 nm) charged into a beaker containing water, 9 g of cerium nitrate for cerium oxide and 4.5 g of zirconyl nitrate for zirconium oxide were charged thereto and dispersed in water. Then, 90 g of the previously prepared cerium-zirconium composite oxide particle A8 was further charged thereto and dispersed by stirring at a high speed, thereby obtaining a slurry of the particle A8 The slurry was dried and fired to prepare Powder a-27 comprising the cerium-zirconium composite oxide particle A8 coated with alumina.

Then, a ball mill was charged with 168 g of Powder a-27, 7 g of boehmite alumina and 38.41 g of activated carbon powder. Powder a-27 was pulverized after supplying 307.5 g of water and 17.5 g of 10% nitric acid solution to the ball mill, thereby obtaining a slurry having an average particle diameter of 3 μm (Slurry a-35).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-31).

Slurry c-1 was coated on a honeycomb type substrate (volume: 0.04 liters) having a diameter of 36φ, 400 cells and 6 mils, followed by drying and firing, thereby forming an alumina layer having a weight of 50 g per one liter of the substrate. Then, Slurry a-35 was coated on the alumina layer, followed by drying and firing, thereby forming a catalyst layer having a weight of 140 g per one liter of the substrate. Next, Slurry b-31 was coated on the catalyst layer, followed by drying and firing, thereby forming a catalyst layer having a weight of 60 g per one liter of the substrate. As a result, a catalyst sample of Example 26 was prepared. Example 26 contains 0.5712 g/L of Pd and 0.2344 g/L of Rh in the catalyst layers, respectively.

Example 27

A ball mill was charged with 180 g of β-zeolite, 288 g of silica-sol ($SiO_2$: 15%) and 32 g of water, followed by pulverization, thereby obtaining a slurry having an average particle diameter of 3 μm (Slurry d-1).

A cerium-zirconium composite oxide particle consisting of 78% cerium and 22% zirconium was used as a first compound. The particle was impregnated with dinitroamine Pd to prepare a cerium-zirconium composite oxide particle carrying 0.85% Pd (hereinafter referred to as "cerium-zirconium composite oxide particle A8").

With 101.46 g (containing 24.6% moisture) of acicular boehmite (10 nmφ×100 nm) charged into a beaker containing water, 9 g of cerium nitrate for cerium oxide and 4.5 g of zirconyl nitrate for zirconium oxide were charged thereto and dispersed in water. Then, 90 g of the previously prepared cerium-zirconium composite oxide particle A8 was further charged thereto and dispersed by stirring at a high speed, thereby obtaining a slurry of the particle A8. The slurry was dried and fired to prepare Powder a-27 comprising the cerium-zirconium composite oxide particle A8 coated with alumina.

Then, a ball mill was charged with 168 g of Powder a-27, 7 g of boehmite alumina and 38.41 g of activated carbon powder. Powder a-27 was pulverized after supplying 307.5 g of water and 17.5 g of 10% nitric acid solution to the ball mill, thereby obtaining a slurry having an average particle diameter of 3 μm (Slurry a-35).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid, Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 165 g of Powder b-1, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-31).

Slurry d-1 was coated on a honeycomb type substrate (volume: 0.04 liters) having a diameter of 36φ, 400 cells and 6 mils, followed by drying and firing, thereby forming a β-zeolite layer having a weight of 50 g per one liter of the substrate. Then, Slurry a-35 was coated on the β-zeolite layer, followed by drying and firing, thereby forming a catalyst layer having a weight of 140 g per one liter of the substrate. Next, Slurry b-31 was coated on the catalyst layer, followed by drying and firing, thereby forming a catalyst layer having a weight of 60 g per one liter of the substrate. As a result, a catalyst sample of Example 27 was prepared. Example 27 contains 0.5712 g/L of Pd and 0.2344 g/L of Rh in the catalyst layers, respectively.

Examples 28 to 31 have an underlayer and contain alumina comprising $La_2O_3$ as a second compound of an interlayer catalyst.

Example 28

A ball mill was charged with 180 g of γ-alumina powder and 20 g of boehmite alumina, followed by pulverization with 282.5 g of water and 17.5 g of 10% nitric acid solution supplied to the ball mill, thereby obtaining a slurry having an average particle diameter of 3 μm (Slurry c-1).

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

With 113.40 g (containing 24.6% moisture) of acicular boehmite (10 nmφ×100 nm) charged into a beaker containing water, 4.5 g of lanthanum nitrate for lanthanum oxide was charged and dispersed in water. Then, 90 g of the previously prepared cerium-zirconium composite oxide particle A was further charged thereto and dispersed by stirring at a high speed, thereby obtaining a slurry of the particle A4. The slurry was dried and fired to prepare Powder a-30 comprising the cerium-zirconium composite oxide particle A4 coated with alumina.

Then, a ball mill was charged with 168 g of Powder a-30, 7 g of boehmite alumina and 38.41 g of activated carbon powder. Powder a-30 was pulverized after supplying 307.5 g of water and 17.5 g of 10% nitric acid solution to the ball mill, thereby obtaining a slurry having an average particle diameter of 3 μm (Slurry a-38).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-31).

Slurry c-1 was coated on a honeycomb type substrate (volume: 0.04 liters) having a diameter of 36φ, 400 cells and 6 mils, followed by drying and firing, thereby forming an alumina layer having a weight of 50 g per one liter of the substrate. Then, Slurry a-38 was coated on the alumina layer, followed by drying and firing, thereby forming a catalyst layer having a weight of 140 g per one liter of the substrate. Next, Slurry b-31 was coated on the catalyst layer, followed by drying and firing, thereby forming a catalyst layer having a weight of 60 g per one liter of the substrate. As a result, a catalyst sample of Example 28 was prepared. Example 28 contains 0.5712 g/L of Pt and 0.2344 g/L of Rh in the catalyst layers, respectively.

Example 29

A ball mill was charged with 180 g of β-zeolite, 288 g of silica-sol (SiO₂: 15%) and 32 g of water, followed by pulverization, thereby obtaining a slurry having an average particle diameter of 3 μm (Slurry d-1).

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

With 113.40 g (containing 24.6% moisture) of acicular boehmite (10 nmφ×100 nm) charged into a beaker containing water, 4.5 g of lanthanum nitrate for lanthanum oxide was charged and dispersed in water. Then, 90 g of the previously prepared cerium-zirconium composite oxide particle A4 was further charged thereto and dispersed by stirring at a high speed, thereby obtaining a slurry of the particle A4. The slurry was dried and fired to prepare Powder a-30 comprising the cerium-zirconium composite oxide particle A4 coated with alumina.

Then, a ball mill was charged with 168 g of Powder a-30, 7 g of boehmite alumina and 38.41 g of activated carbon powder. Powder a-30 was pulverized after supplying 307.5 g of water and 17.5 g of 10% nitric acid solution to the ball mill, thereby obtaining a slurry having an average particle diameter of 3 μm (Slurry a-38).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-31).

Slurry d-1 was coated on a honeycomb type substrate (volume: 0.04 liters) having a diameter of 36φ, 400 cells and 6 mils, followed by drying and firing, thereby forming a β-zeolite layer having a weight of 50 g per one liter of the substrate. Then, Slurry a-38 was coated on the β-zeolite layer, followed by drying and firing, thereby forming a catalyst layer having a weight of 140 g per one liter of the substrate. Next, Slurry b-31 was coated on the catalyst layer, followed by drying and firing, thereby forming a catalyst layer having a weight of 60 g per one liter of the substrate. As a result, a catalyst sample of Example 29 was prepared. Example 29 contains 0.5712 g/L of Pt and 0.2344 g/L of Rh in the catalyst layers, respectively.

Example 30

A ball mill was charged with 180 g of γ-alumina powder and 20 g of boehmite alumina, followed by pulverization with 282.5 g of water and 17.5 g of 10% nitric acid solution supplied to the ball mill, thereby obtaining a slurry having an average particle diameter of 3 μm (Slurry c-1).

A cerium-zirconium composite oxide particle consisting of 78% cerium and 22% zirconium was used as a first compound. The particle was impregnated with dinitroamine Pd to prepare a cerium-zirconium composite oxide particle carrying 0.85% Pd (hereinafter referred to as "cerium-zirconium composite oxide particle A8").

With 113.40g (containing 24.6% moisture) of acicular boehmite (10 nmφ×100 nm) charged into a beaker containing water, 4.5 g of lanthanum nitrate for lanthanum oxide was charged and dispersed in water. Then, 90 g of the previously prepared cerium-zirconium composite oxide particle A8 was further charged thereto and dispersed by stirring at a high speed, thereby obtaining a slurry of the particle A8. The slurry was dried and fired to prepare Powder a-31 comprising the cerium-zirconium composite oxide particle A8 coated with alumina.

Thereafter, a ball mill was charged with 168 g of Powder a-31, 7 g of boehmite alumina and 38.41 g of activated carbon powder. Powder a-31 was pulverized after supplying 307.5 g of water and 17.5 g of 10% nitric acid solution to the ball mill, thereby obtaining a slurry having an average particle diameter of 3 μm (Slurry a-39).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture)

of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Then, a ball mill was charged with 168 g of Powder b-1, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-31).

Slurry c-1 was coated on a honeycomb type substrate (volume: 0.04 liters) having a diameter of 36ϕ, 400 cells and 6 mils, followed by drying and firing, thereby forming an alumina layer having a weight of 50 g per one liter of the substrate. Then, Slurry a-39 was coated on the alumina layer, followed by drying and firing, thereby forming a catalyst layer having a weight of 140 g per one liter of the substrate. Next, Slurry b-31 was coated on the catalyst layer, followed by drying and firing, thereby forming a catalyst layer having a weight of 60 g per one liter of the substrate. As a result, a catalyst sample of Example 30 was prepared. Example 30 contains 0.5712 g/L of Pd and 0.2344 g/L of Rh in the catalyst layers, respectively.

Example 31

A ball mill was charged with 180 g of β-zeolite, 288 g of silica-sol ($SiO_2$: 15%) and 32 g of water, followed by pulverization, thereby obtaining a slurry having an average particle diameter of 3 μm (Slurry d-1).

A cerium-zirconium composite oxide particle consisting of 78% cerium and 22% zirconium was used as a first compound. The particle was impregnated with dinitroamine Pd to prepare a cerium-zirconium composite oxide particle carrying 0.85% Pd (hereinafter referred to as "cerium-zirconium composite oxide particle A8").

With 113.40 g (containing 24.6% moisture) of acicular boehmite (10 nmϕ×100 nm) charged into a beaker containing water, 4.5 g of lanthanum nitrate for lanthanum oxide was charged and dispersed in water. Then, 90 g of the previously prepared cerium-zirconium composite oxide particle A8 was further charged thereto and dispersed by stirring at a high speed, thereby obtaining a slurry of the particle A8. The slurry was dried and fired to prepare Powder a-31 comprising the cerium-zirconium composite oxide particle A8 coated with alumina.

Then, a ball mill was charged with 168 g of Powder a-31, 7 g of boehmite alumina and 38.41 g of activated carbon powder. Powder a-31 was pulverized after supplying 307.5 g of water and 17.5 g of 10% nitric acid solution to the ball mill, thereby obtaining a slurry having an average particle diameter of 3 μm (Slurry a-39).

Next, a zirconium-lanthanum composite oxide particle having an average particle diameter of 20 nm was impregnated with rhodium nitrate, thereby preparing Particle B carrying 0.814% rhodium. 118.42 g (containing 24% moisture) of acicular boehmite was charged into a beaker, followed by dispersion in water and deflocculation with an acid. Then, 90 g of the previously prepared particle B was further charged thereto and dispersed by stirring at a high speed, thereby obtaining a slurry of Particle B. The slurry was dried and fired to prepare Powder b-1 comprising Particle B coated with alumina.

Thereafter, a ball mill was charged with 168 g of Powder b-1, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-31).

Slurry c-1 was coated on a honeycomb type substrate (volume: 0.04 liters) having a diameter of 36ϕ, 400 cells and 6 mils, followed by drying and firing, thereby forming a β-zeolite layer having a weight of 50 g per one liter of the substrate. Then, Slurry a-39 was coated on the, β-zeolite layer, followed by drying and firing, thereby forming a catalyst layer having a weight of 140 g per one liter of the substrate. Next, Slurry b-31 was coated on the catalyst layer, followed by drying and firing, thereby forming a catalyst layer having a weight of 60 g per one liter of the substrate. As a result, a catalyst sample of Example 31 was prepared. Example 31 contains 0.5712 g/L of Pd and 0.2344 g/L of Rh in the catalyst layers, respectively.

Examples 28 to 31 have an underlayer and contain alumina comprising $La_2O_3$ as a second compound of an interlayer catalyst.

Examples 32 to 37 have an underlayer and have different contents of first and second compounds in a surface catalyst layer.

Example 32

A ball mill was charged with 180 g of γ-alumina powder and 20 g of boehmite alumina, followed by pulverization with 282.5 g of water and 17.5 g of 10% nitric acid solution supplied to the ball mill, thereby obtaining a slurry having an average particle diameter of 3 μm (Slurry c-1).

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

With 113.40 g (containing 24.6% moisture) of acicular boehmite (10 nmϕ×100 nm) charged into a beaker containing water, 4.5 g of lanthanum nitrate for lanthanum oxide was charged and dispersed in water. Then, 90 g of the previously prepared cerium-zirconium composite oxide particle A4 was further charged thereto and dispersed by stirring at a high speed, thereby obtaining a slurry of the particle A4. The slurry was dried and fired to prepare Powder a-30 comprising the cerium-zirconium composite oxide particle A4 coated with alumina.

Then, a ball mill was charged with 168 g of Powder a-30, 7 g of boehmite alumina and 38.41 g of activated carbon powder. Powder a-30 was pulverized after supplying 307.5 g of water and 17.5 g of 10% nitric acid solution to the ball mill, thereby obtaining a slurry having an average particle diameter of 3 μm (Slurry a-38).

Next, a zirconium-lanthanum (99:1) composite oxide particle having an average particle diameter of 20 nm was impregnated with rhodium nitrate, thereby preparing Particle B13 carrying 1.0175% rhodium. 142.1 g (containing 24% moisture) of acicular boehmite was charged into a beaker, followed by dispersion in water and deflocculation with an acid. Then, 72 g of the previously prepared particle B13 was further charged thereto and dispersed by stirring at a high speed, thereby obtaining a slurry of Particle B13. The slurry was dried and fired to prepare Powder b-13 comprising Particle B13 coated with alumina.

Then, a ball mill was charged with 168 g of Powder b-13, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-41).

Slurry c-1 was coated on a honeycomb type substrate (volume: 0.04 liters) having a diameter of 36ϕ, 400 cells and 6 mils, followed by drying and firing, thereby forming an alumina layer having a weight of 50 g per one liter of the substrate. Then, Slurry a-38 was coated on the alumina layer, followed by drying and firing, thereby forming a catalyst layer having a weight of 140 g per one liter of the substrate. Next, Slurry b-41 was coated on the catalyst layer, followed by drying and firing, thereby forming a catalyst layer having a weight of 60 g per one liter of the substrate. As a result, a catalyst sample of Example 32 was prepared. Example 32 contains 0.5712 g/L of Pt and 0.2344 g/L of Rh in the catalyst layers, respectively.

Example 33

A ball mill was charged with 180 g of γ-alumina powder and 20 g of boehmite alumina, followed by pulverization with 282.5 g of water and 17.5 g of 10% nitric acid solution supplied to the ball mill, thereby obtaining a slurry having an average particle diameter of 3 μm (Slurry c-1).

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

With 113.40 g (containing 24.6% moisture) of acicular boehmite (10 nmϕ×100 nm) charged into a beaker containing water, 4.5 g of lanthanum nitrate for lanthanum oxide was charged and dispersed in water. Then, 90 g of the previously prepared cerium-zirconium composite oxide particle A4 was further charged thereto and dispersed by stirring at high speed, thereby obtaining a slurry of the particle A4. The slurry was dried and fired to prepare Powder a-30 comprising the cerium-zirconium composite oxide particle A4 coated with alumina.

Then, a ball mill was charged with 168 g of Powder a-30, 7 g of boehmite alumina, and 38.41 g of activated carbon powder. Powder a-30 was pulverized after supplying 307.5 g of water and 17.5 g of 10% nitric acid solution to the ball mill, thereby obtaining a slurry having an average particle diameter of 3 μm (Slurry a-38).

Next, a zirconium-lanthanum (99:1) composite oxide particle having an average particle diameter of 20 nm was impregnated with rhodium nitrate, thereby preparing Particle B14 carrying 0.5814% rhodium. 71.1 g (containing 24% moisture) of acicular boehlnite was charged into a beaker, followed by dispersion in water and deflocculation with an acid. Then, 126 g of the previously prepared particle B14 was further charged thereto and dispersed by stirring at a high speed, thereby obtaining a slurry of Particle B14. The slurry was dried and fired to prepare Powder b-14 comprising Particle B14 coated with alumina.

Then, a ball mill was charged with 168 g of Powder b-14, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-42).

Slurry c-1 was coated on a honeycomb type substrate (volume: 0.04 liters) having a diameter of 36ϕ, 400 cells and 6 mils, followed by drying and firing, thereby forming an alumina layer having a weight of 50 g per one liter of the substrate. Then, Slurry a-38 was coated on the alumina layer, followed by drying and firing, thereby forming a catalyst layer having a weight of 140 g per one liter of the substrate. Next, Slurry b-42 was coated on the catalyst layer, followed by drying and firing, thereby forming a catalyst layer having a weight of 60 g per one liter of the substrate. As a result, a catalyst sample of Example 33 was prepared. Example 33 contains 0.5712 g/L of Pt and 0.2344 g/L of Rh in the catalyst layers, respectively.

Example 34

A ball mill was charged with 180 g of γ-alumina powder and 20 g of boehmite alumina, followed by pulverization with 282.5 g of water and 17.5 g of 10% nitric acid solution supplied to the ball mill, thereby obtaining a slurry having an average particle diameter of 3 μm (Slurry c-1).

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

With 113.40 g (containing 24.6% moisture) of acicular boehnite (10 nmϕ×100 nm) charged into a beaker containing water, 4.5 g of lanthanum nitrate for lanthanum oxide was charged and dispersed in water. Then, 90 g of the previously prepared cerium-zirconium composite oxide particle A4 was further charged thereto and dispersed by stirring at a high speed, thereby obtaining a slurry of the particle A4. The slurry was dried and fired to prepare Powder a-30 comprising the cerium-zirconium composite oxide particle A4 coated with alumina.

Thereafter, a ball mill was charged with 168 g of Powder a-30, 7 g of boehmite alumina and 38.41 g of activated carbon powder. Powder a-30 was pulverized after supplying 307.5 g of water and 17.5 g of 10% nitric acid solution to the ball mill, thereby obtaining a slurry having an average particle diameter of 3 μm (Slurry a-38).

Next, a zirconium-lanthanum (99:1) composite oxide particle having an average particle diameter of 20 nm was impregnated with rhodium nitrate, thereby preparing Particle B15 carrying 0.5426% rhodium. 59.21 g (containing 24% moisture) of acicular boehmite was charged into a beaker, followed by dispersion in water and deflocculation with an acid. Then, 135 g of the previously prepared particle B15 was further charged thereto and dispersed by stirring at a high speed, thereby obtaining a slurry of Particle B15. The slurry was dried and fired to prepare Powder b-14 comprising Particle B15 coated with alumina.

Then, a ball mill was charged with 168 g of Powder b-15, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-43).

Slurry c-1 was coated on a honeycomb type substrate (volume: 0.04 liters) having a diameter of 36ϕ, 400 cells and 6 mils, followed by drying and firing, thereby forming an alumina layer having a weight of 50 g per one liter of the substrate. Then, Slurry a-38 was coated on the alumina layer, followed by drying and firing, thereby forming a catalyst layer having a weight of 140 g per one liter of the substrate. Next, Slurry b-43 was coated on the catalyst layer, followed by drying and firing, thereby forming a catalyst layer having a weight of 60 g per one liter of the substrate. As a result, a catalyst sample of Example 34 was prepared. Example 34 contains 0.5712 g/L of Pt and 0.2344 g/L of Rh in the catalyst layers, respectively.

Example 35

A ball mill was charged with 180 g of γ-alumina powder and 20 g of boehmite alumina, followed by pulverization with 282.5 g of water and 17.5 g of 10% nitric acid solution supplied to the ball mill, thereby obtaining a slurry having an average particle diameter of 3 μm (Slurry c-1).

A cerium-zirconium composite oxide particle consisting of 78% cerium and 22% zirconium was used as a first compound. The particle was impregnated with dinitroamine Pd to prepare a cerium-zirconium composite oxide particle carrying 0.85% Pd (hereinafter referred to as "cerium-zirconium composite oxide particle A8").

With 113.40 g (containing 24.6% moisture) of acicular boehmite (10 nmϕ×100 nm) charged into a beaker containing water, 4.5 g of lanthanum nitrate for lanthanum oxide was charged and dispersed in water. Then, 90 g of the previously prepared cerium-zirconium composite oxide particle A8 was further charged thereto and dispersed by stirring at a high speed, thereby obtaining a slurry of the particle A8. The slurry was dried and fired to prepare Powder a-31 comprising the cerium-zirconium composite oxide particle A8 coated with alumina.

Then, a ball mill was charged with 168 g of Powder a-31, 7 g of boehmite alumina, and 38.41 g of activated carbon powder. Powder a-31 was pulverized after supplying 307.5 g of water and 17.5 g of 10% nitric acid solution to the ball mill, thereby obtaining a slurry having an average particle diameter of 3 μm (Slurry a-39).

Next, a zirconium-lanthanum (99:1) composite oxide particle having an average particle diameter of 20 nm was impregnated with rhodium nitrate, thereby preparing Particle B14 carrying 0.5814% rhodium. 71.1 g (containing 24% moisture) of acicular boehlnite was charged into a beaker, followed by dispersion in water and deflocculation with an acid. Then, 126 g of the previously prepared particle B14 was further charged thereto and dispersed by stirring at a high speed, thereby obtaining a slurry of Particle B14. The slurry was dried and fired to prepare Powder b-14 comprising Particle B14 coated with alumina.

Then, a ball mill was charged with 168 g of Powder b-14, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-42).

Slurry c-1 was coated on a honeycomb type substrate (volume: 0.04 liters) having a diameter of 36ϕ, 400 cells and 6 mils, followed by drying and firing, thereby forming an alumina layer having a weight of 50 g per one liter of the substrate. Then, Slurry a-39 was coated on the alumina layer, followed by drying and firing, thereby forming a catalyst layer having a weight of 140 g per one liter of the substrate. Next, Slurry b-42 was coated on the catalyst layer, followed by drying and firing, thereby forming a catalyst layer having a weight of 60 g per one liter of the substrate. As a result, a catalyst sample of Example 35 was prepared. Example 35 contains 0.5712 g/L of Pd and 0.2344 g/L of Rh in the catalyst layers, respectively.

Example 36

A ball mill was charged with 180 g of β-zeolite, 288 g of silica-sol (SiO$_2$: 15%), and 32 g of water, followed by pulverization, thereby obtaining a slurry having an average particle diameter of 3 μm (Slurry d-1).

A cerium-zirconium composite oxide particle consisting of 78% cerium and 22% zirconium was used as a first compound. The particle was impregnated with dinitroamine Pt to prepare a cerium-zirconium composite oxide particle carrying 0.85% Pt (hereinafter referred to as "cerium-zirconium composite oxide particle A4").

With 113.40 g (containing 24.6% moisture) of acicular boebmite (10 nmϕ×100 nm) charged into a beaker containing water, 4.5 g of lanthanum nitrate for lanthanum oxide was charged and dispersed in water. Then, 90 g of the previously prepared cerium-zirconium composite oxide particle A4 was further charged thereto and dispersed by stirring at a high speed, thereby obtaining a slurry of the particle A4. The slurry was dried and fired to prepare Powder a-30 comprising the cerium-zirconium composite oxide particle A4 coated with alumina.

Then, a ball mill was charged with 168 g of Powder a-30, 7 g of boehmite alumina and 38.41 g of activated carbon powder. Powder a-30 was pulverized after supplying 307.5 g of water and 17.5 g of 10% nitric acid solution to the ball mill, thereby obtaining a slurry having an average particle diameter of 3 μm (Slurry a-38).

Next, a zirconium-lanthanum (99:1) composite oxide particle having an average particle diameter of 20 nm was impregnated with rhodium nitrate, thereby preparing Particle B14 carrying 0.5814% rhodium. 71.1 g (containing 24% moisture) of acicular boehmite was charged into a beaker, followed by dispersion in water and deflocculation with an acid. Then, 126 g of the previously prepared particle B14 was further charged thereto and dispersed by stirring at a high speed, thereby obtaining a slurry of Particle B14. The slurry was dried and fired to prepare Powder b-14 comprising Particle B14 coated with alumina.

Thereafter, a ball mill was charged with 168 g of Powder b-14, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-42).

Slurry d-1 was coated on a honeycomb type substrate (volume: 0.04 liters) having a diameter of 36ϕ, 400 cells and 6 mils, followed by drying and firing, thereby forming a β-zeolite layer having a weight of 50 g per one liter of the substrate. Then, Slurry a-38 was coated on the β-zeolite layer, followed by drying and firing, thereby forming a catalyst layer having a weight of 140 g per one liter of the substrate. Next, Slurry b-42 was coated on the catalyst layer, followed by drying and firing, thereby forming a catalyst layer having a weight of 60 g per one liter of the substrate. As a result, a catalyst sample of Example 36 was prepared. Example 36 contains 0.5712 g/L of Pt and 0.2344 g/L of Rh in the catalyst layers, respectively.

Example 37

A ball mill was charged with 180 g of β-zeolite, 288 g of silica-sol (SiO$_2$: 15%), and 32 g of water, followed by pulverization, thereby obtaining a slurry having an average particle diameter of 3 μm (Slurry d-1).

A cerium-zirconium composite oxide particle consisting of 78% cerium and 22% zirconium was used as a first compound. The particle was impregnated with dinitroamine Pd to prepare a cerium-zirconium composite oxide particle carrying 0.85% Pd (hereinafter referred to as "cerium-zirconium composite oxide particle A8").

With 113.40 g (containing 24.6% moisture) of acicular boehmite (10 nmφ×100 nm) charged into a beaker containing water, 4.5 g of lanthanum nitrate for lanthanum oxide was charged and dispersed in water. Then, 90 g of the previously prepared cerium-zirconium composite oxide particle A8 was further charged thereto and dispersed by stirring at a high speed, thereby obtaining a slurry of the particle A8. The slurry was dried and fired to prepare Powder a-31 comprising the cerium-zirconium composite oxide particle A8 coated with alumina.

Thereafter, a ball mill was charged with 168 g of Powder a-31, 7 g of boehmite alumina and 35.41 g of activated carbon powder. Powder a-31 was pulverized after supplying 307.5 g of water and 17.5 g of 10% nitric acid solution to the ball mill, thereby obtaining a slurry having an average particle diameter of 3 μm (Slurry a-39).

Next, a zirconium-lanthanum (99:1) composite oxide particle having an average particle diameter of 20 nm was impregnated with rhodium nitrate, thereby preparing Particle B14 carrying 0.5814% rhodium. 71.1 g (containing 24% moisture) of acicular boehmite was charged into a beaker, followed by dispersion in water and deflocculation with an acid. Then, 126 g of the previously prepared particle B14 was further charged thereto and dispersed by stirring at a high speed, thereby obtaining a slurry of Particle B14. The slurry was dried and fired to prepare Powder b-14 comprising Particle B14 coated with alumina.

Then, a ball mill was charged with 168 g of Powder b-14, 7 g of boehmite alumina and 38.41 g of activated carbon powder, followed by pulverization with 307.5 g of water and 17.5 g of 10% nitric acid solution supplied to the ball mill, thereby obtaining a slurry having an average particle diameter of 3 μm (Slurry b-42).

Slurry d-1 was coated on a honeycomb type substrate (volume: 0.04 liters) having a diameter of 36φ, 400 cells and 6 mils, followed by drying and firing, thereby forming a β-zeolite layer having a weight of 50 g per one liter of the substrate. Then, Slurry a-39 was coated on the β-zeolite layer, followed by drying and firing, thereby forming a catalyst layer having a weight of 140 g per one liter of the substrate. Next, Slurry b-42 was coated on the catalyst layer, followed by drying and firing, thereby forming a catalyst layer having a weight of 60 g per one liter of the substrate. As a result, a catalyst sample of Example 37 was prepared. Example 37 contains 0.5712 g/L of Pd and 0.2344 g/L of Rh in the catalyst layers, respectively.

Comparative Examples 1 and 2 are to be compared with Examples 1 to 8.

Comparative Example 1

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

90 g of the cerium-zirconium composite oxide particle A was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder a-3 comprising the particle A coated with alumina. This alumina had a particle diameter of 7 to 8 nm.

A ball mill was charged with 168 g of Powder a-3 and 7 g of boehmite alumina. Then, Powder a-3 was pulverized, with 307.5 g of water and 17.5 g of 10% nitric acid solution supplied to the ball mill, thereby obtaining a slurry having an average particle diameter of 3 μm (Slurry a-9).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Thereafter, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-9 was coated at a density of 140 g/L and dried on a honeycomb type substrate (volume: 0.04 liters) having a diameter of 36φ, 400 cells and 6 mils. Then, Slurry b-9 was coated at a density of 60 g/L thereon, followed by drying and firing at 400° C., thereby preparing a catalyst sample of Comparative Example 1. Comparative Example 1 contains 0.5712 g/L of Pt and 0.2344 g/L of Rh in the catalyst layers, respectively.

Comparative Example 2

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

90 g of the cerium-zirconium composite oxide particle A was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder a-3 comprising the particle A coated with alumina. This alumina had a particle diameter of 7 to 8 nm.

A ball mill was charged with 168 g of Powder a-3, 7 g of boehmite alumina and 94.23 g of activated carbon powder. Then, Powder a-3 was pulverized, with 307.5 g of water and 17.5 g of 10% nitric acid solution supplied to the ball mill, thereby obtaining a slurry having an average particle diameter of 3 μm (Slurry a-10).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Then, a ball mill was charged with 168 g of Powder b-2, 7 g of boehmite alumina and 94.23 g of activated carbon powder, followed by pulverization with 307.5 g of water and 17.5 g of 10% nitric acid solution supplied to the ball mill, thereby obtaining a slurry having an average particle diameter of 3 μm (Slurry b-10).

Slurry a-10 was coated on a honeycomb type substrate (volume: 0.04 liters) having a diameter of 36φ, 400 cells and 6 mils, followed by drying and firing, thereby forming a catalyst layer having a weight of 140 g per one liter of the substrate. Then, Slurry b-10 was coated on the catalyst layer, followed by drying and firing, thereby forming a catalyst layer having a weight of 60 g per one liter of the substrate. As a result, a catalyst sample of Comparative Example 2 was prepared. Comparative Example 2 contains 0.5712 g/L of Pt and 0.2344 g/L of Rh in the catalyst layers, respectively.

Comparative Examples 3 and 4 are to be compared with Examples 9 to 14.

Comparative Example 3

A cerium-zirconium composite oxide particle having a fine pore volume of 0.15 cm$^3$/g was used as a first compound. The particle was impregnated with dinitroamine Pt to prepare a cerium-zirconium composite oxide particle carrying 0.85% Pt (hereinafter referred to as "Particle Aa").

90 g of Particle Aa was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder a-9 comprising Particle Aa coated with alumina.

A ball mill was charged with 168 g of Powder a-9 and 7 g of boehmite alumina. Then, Powder a-9 was pulverized, with 307.5 g of water and 17.5 g of 10% nitric acid solution supplied to the ball mill, thereby obtaining a slurry having an average particle diameter of 3 μm (Slurry a-17).

Next, a zirconium-lanthanum composite oxide particle having a fine pore volume of 0.16 cm$^3$/g was impregnated with rhodium nitrate, thereby preparing Particle Bb carrying 0.814% rhodium. 90 g of Particle Bb was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-6 comprising Particle Bb coated with alumina.

Then, a ball mill was charged with 168 g of Powder b-6 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-15).

Slurry a-17 was coated on a honeycomb type substrate (volume: 0.04 liters) having a diameter of 36ϕ, 400 cells and 6 mils, followed by drying and firing, thereby forming a catalyst layer having a weight of 140 g per one liter of the substrate. Then, Slurry b-17 was coated on the catalyst layer, followed by drying and firing, thereby forming a catalyst layer having a weight of 60 g per one liter of the substrate. As a result, a catalyst sample of Comparative Example 3 was prepared. Comparative Example 3 contains 0.5712 g/L of Pt and 0.2344 g/L of Rh in the catalyst layers, respectively.

Comparative Example 4

A cerium-zirconium composite oxide particle having an average particle diameter of 30 nm was used as a first compound. The particle was impregnated with dinitroamine Pt to prepare a cerium-zirconium composite oxide particle carrying 0.85% Pt Thereinafter referred to as "cerium-zirconium composite oxide particle A").

90.9 g (containing 1% moisture) of alumina nano-particles having an average particle diameter of 130 nm was charged into a beaker, followed by dispersion in water and acidification. Then, 90 g of the previously prepared cerium-zirconium composite oxide particle A was further charged thereto and dispersed by stirring at a high speed, thereby obtaining a slurry of the particle A. The slurry was dried and fired to prepare Powder a-10 comprising the cerium-zirconium composite oxide particle A coated with alumina.

A ball mill was charged with 168 g of Powder a-10 and 7 g of boehmite alumina. Then, Powder a-10 was pulverized, with 307.5 g of water and 17.5 g of 10% nitric acid solution supplied to the ball mill, thereby obtaining a slurry having an average particle diameter of 3 μm (Slurry a-18).

Next, a zirconium-lanthanum composite oxide particle having an average particle diameter of 20 nm was impregnated with rhodium nitrate, thereby preparing Particle B carrying 0.814% rhodium. 90.9 g (containing 1% moisture) of alumina nano-particles having an average particle diameter of 130 nm was charged into a beaker, followed by dispersion in water and acidification. Then, 90.9 g of Particle B was further charged thereto and dispersed by stirring at a high speed, thereby obtaining a slurry of Particle B. The slurry was dried and fired, thereby preparing Powder b-7 comprising Particle B coated with alumina.

Thereafter, a ball mill was charged with 168 g of Powder b-7 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-16).

Slurry a-18 was coated on a honeycomb type substrate (volume: 0.04 liters) having a diameter of 36ϕ, 400 cells and 6 mils, followed by drying and firing, thereby forming a catalyst layer having a weight of 140 g per one liter of the substrate. Then, Slurry b-16 was coated on the catalyst layer, followed by drying and firing, thereby forming a catalyst layer having a weight of 60 g per one liter of the substrate, As a result, a catalyst sample of Comparative Example 4 was prepared. Comparative Example 4 contains 0.5712 g/L of Pt and 0.2344 g/L of Rh in the catalyst layers, respectively.

Comparative Examples 5 and 6 are to be compared with Examples 15 to 17.

Comparative Example 5

A cerium-zirconium composite oxide particle consisting of 60% cerium and 40% zirconium was used as a first compound. The particle was impregnated with dinitroamnine Pt to prepare a cerium-zirconium composite oxide particle carrying 0.85% Pt thereinafter referred to as "cerium-zirconium composite oxide particle A6").

90 g of the particle A6 was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder a-14 comprising the particle A6 coated with alumina.

A ball mill was charged with 168 g of Powder a-14 and 7 g of boehmite alumina. Then, Powder a-14 was pulverized, with 307.5 g of water and 17.5 g of 10% nitric acid solution supplied to the ball mill, thereby obtaining a slurry having an average particle diameter of 3 μm (Slurry a-22).

Next, a zirconium-lanthanum composite oxide particle comprising 80% zirconium and 20% lanthanum was impregnated with rhodium nitrate, thereby preparing Particle B5 carrying 0.814% rhodium. 90 g of Particle B5 was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-11 comprising Particle B5 coated with alumina.

Thereafter, a ball mill was charged with 168 g of Powder b-11 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-20).

Slurry a-22 was coated on a honeycomb type substrate (volume: 0.04 liters) having a diameter of 36ϕ, 400 cells and 6 mils, followed by drying and firing, thereby forming a catalyst layer having a weight of 140 g per one liter of the substrate. Then, Slurry b-20 was coated on the catalyst layer, followed by drying and firing, thereby forming a catalyst layer having a weight of 60 g per one liter of the substrate. As a result, a catalyst sample of Comparative Example 5 was prepared. Comparative Example 5 contains 0.5712 g/L of Pt and 0.2344 g/L of Rh in the catalyst layers, respectively.

Comparative Examples 6

A cerium-zirconium composite oxide particle consisting of 90% cerium and 10% zirconium was used as a first compound. The particle was impregnated with dinitroamine Pt to prepare a cerium-zirconium composite oxide particle carrying 0.85% Pt (hereinafter referred to as "cerium-zirconium composite oxide particle A7").

90 g of the particle A7 was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder a-5 comprising the cerium-zirconium composite oxide particle A7 coated with alumina.

A ball mill was charged with 168 g of Powder a-15 and 7 g of boehmite alumina. Then, Powder a-15 was pulverized, with 307.5 g of water and 17.5 g of 10% nitric acid solution supplied to the ball mill, thereby obtaining a slurry having an average particle diameter of 3 μm (Slurry a-23).

Next, a particle consisting of 100% zirconium was impregnated with rhodium nitrate, thereby preparing Particle B6 carrying 0.814% rhodium. 90 g of Particle B6 was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-12 comprising Particle B6 coated with alumina.

Then, a ball mill was charged with 168 g of Powder b-12 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-21).

Slurry a-23 was coated on a honeycomb type substrate (volume: 0.04 liters) having a diameter of 36ϕ, 400 cells and 6 mils, followed by drying and firing, thereby forming a catalyst layer having a weight of 140 g per one liter of the substrate. Then, Slurry b-21 was coated on the catalyst layer, followed by drying and firing, thereby forming a catalyst layer having a weight of 60 g per one liter of the substrate. As a result, a catalyst sample of Comparative Example 6 was prepared. Comparative Example 6 contains 0.5712 g/L of Pt and 0.2344 g/L of Rh in the catalyst layers, respectively.

Comparative Examples 7 and 8 are to be compared with Examples 18 to 20.

Comparative Example 7

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

1.8 g of cerium acetylacetonate for cerium oxide and 0.9 g of zirconium acetylacetonate for zirconium oxide were added to about 90 g of aluminum isopropoxide for $Al_2O_3$ dissolved in 2-methyl-2,4-pentanediol, followed by addition of 90 g of the particle A and hydrolysis with water. Water and organic materials including 2-methyl-2,4-pentanediol and the like were dried by evaporation, and then fired to prepare Powder a-19 comprising the cerium-zirconium composite oxide particle A coated with alumina.

A ball mill was charged with 168 g of Powder a-19 and 7 g of boehmite alumina. Then, Powder a-19 was pulverized, with 307.5 g of water and 17.5 g of 10% nitric acid solution supplied to the ball mill, thereby obtaining a slurry having an average particle diameter of 3 μm (Slurry a-27).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Then, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-27 was coated at a density of 140 g/L and dried on a honeycomb type substrate (volume: 0.04 liters) having a diameter of 36ϕ, 400 cells and 6 mils. Then, Slurry b-9 was coated at a density of 60 g/L thereon, followed by drying and firing at 400° C., thereby preparing a catalyst sample of Comparative Example 7, Comparative Example 7 contains 0.5712 g/L of Pt and 0.2344 g/L of Rh in the catalyst layers, respectively.

Comparative Example 8

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

18 g of cerium acetylacetonate for cerium oxide and 13.5 g of zirconium acetylacetonate for zirconium oxide were added to about 58.5 g of aluminum isopropoxide for $Al_2O_3$ dissolved in 2-methyl-2,4-pentanediol, followed by addition of 90 g of the particle A and hydrolysis with water. Water and organic materials including 2-methyl-2,4-pentanediol and the like were dried by evaporation, and then fired to prepare Powder a-20 comprising the cerium-zirconium composite oxide particle A coated with alumina.

A ball mill was charged with 168 g of Powder a-20 and 7 g of boehmite alumina. Then, Powder a-20 was pulverized, with 307.5 g of water and 17.5 g of 10% nitric acid solution supplied to the ball mill, thereby obtaining a slurry having an average particle diameter of 3 μm (Slurry a-28).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for Al₂O₃ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Then, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-28 was coated at a density of 140 g/L and dried on a honeycomb type substrate (volume: 0.04 liters) having a diameter of 36φ, 400 cells and 6 mils. Thereafter, Slurry b-9 was coated at a density of 60 g/L thereon, followed by drying and firing at 400° C., thereby preparing a catalyst sample of Comparative Example 8. Comparative Example 8 contains 0.5712 g/L of Pt and 0.2344 g/L of Rh in the catalyst layers, respectively.

Comparative Examples 9 and 10 are to be compared with Examples 21 to 23.

Comparative Example 9

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

0.9 g of lanthanum acetate for lanthanum oxide was added to about 89.1 g of aluminum isopropoxide for Al₂O₃ dissolved in 2-methyl-2,4-pentanediol, followed by addition of 90 g of the particle A and hydrolysis with water. Water and organic materials including 2-methyl-2,4-pentanediol and the like were dried by evaporation, and then fired to prepare Powder a-24 comprising the cerium-zirconium composite oxide particle A coated with alumina.

A ball mill was charged with 168 g of Powder a-24 and 7 g of boehmite alumina. Then, Powder a-24 was pulverized, with 307.5 g of water and 17.5 g of 10% nitric acid solution supplied to the ball mill, thereby obtaining a slurry having an average particle diameter of 3 μm (Slurry a-32).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for Al₂O₃ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Then, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-32 was coated at a density of 140 g/L and dried on a honeycomb type substrate (volume: 0.04 liters) having a diameter of 36φ, 400 cells and 6 mils. Then, Slurry b-9 was coated at a density of 60 g/L thereon, followed by drying and firing at 400° C., thereby preparing a catalyst sample of Comparative Example 9. Comparative Example 9 contains 0.5712 g/L of Pt and 0.2344 g/L of Rh in the catalyst layers, respectively.

Comparative Example 10

A cerium-zirconium composite oxide particle having an average particle diameter of 30 nm was used as a first compound. The particle was impregnated with dinitroamine Pt to prepare a cerium-zirconium composite oxide particle carrying 0.85% Pt (hereinafter referred to as "cerium-zirconium composite oxide particle A").

13.5 g of lanthanum acetate for lanthanum oxide was added to about 76.5 g of aluminum isopropoxide for Al₂O₃ dissolved in 2-methyl-2,4-pentanediol, followed by addition of 90 g of the particle A and hydrolysis with water. Water and organic materials including 2-methyl-2,4-pentanediol and the like were dried by evaporation, and then fired to prepare Powder a-25 comprising the particle A coated with alumina.

A ball mill was charged with 168 g of Powder a-25 and 7 g of boehmite alumina. Then, Powder a-25 was pulverized, with 307.5 g of water and 17.5 g of 10% nitric acid solution supplied to the ball mill, thereby obtaining a slurry having an average particle diameter of 3 μm (Slurry a-33).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for Al₂O₃ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Thereafter, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-33 was coated at a density of 140 g/L and dried on a honeycomb type substrate (volume: 0.04 liters) having a diameter of 36φ, 400 cells and 6 mils. Then, Slurry b-9 was coated at a density of 60 g/L thereon, followed by drying and firing at 400° C., thereby preparing a catalyst sample of Comparative Example 10. Comparative Example 10 contains 0.5712 g/L of Pt and 0.2344 g/L of Rh in the catalyst layers, respectively.

Comparative Examples 11 and 12 are to be compared with Examples 24 to 27.

Comparative Example 11

A cerium-zirconium composite oxide particle consisting of 60% cerium and 40% zirconium was used as a first compound. The particle was impregnated with dinitroamine Pt to prepare a cerium-zirconium composite oxide particle carrying 0.85% Pt (hereinafter referred to as "cerium-zirconium composite oxide particle A6").

1.8 g of cerium acetylacetonate for cerium oxide and 0.9 g of zirconium acetylacetonate for zirconium oxide were added to about 87.3 g of aluminum isopropoxide for Al₂O₃ dissolved in 2-methyl-2,4-pentanediol, followed by addition of 90 g of the particle A6 and hydrolysis with water. Water and organic materials including 2-methyl-2,4-pentanediol and the like were dried by evaporation, and then fired to prepare Powder a-28 comprising the particle A6 coated with alumina.

A ball mill was charged with 168 g of Powder a-28 and 7 g of boehmite alumina. Then, Powder a-28 was pulverized, with 307.5 g of water and 17.5 g of 10% nitric acid solution supplied to the ball mill, thereby obtaining a slurry having an average particle diameter of 3 μm (Slurry a-36).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Then, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-36 was coated at a density of 140 g/L and dried on a honeycomb type substrate (volume: 0.04 liters) having a diameter of 36φ, 400 cells and 6 mils. Then, Slurry b-9 was coated at a density of 60 g/L thereon, followed by drying and firing at 400° C., thereby preparing a catalyst sample of Comparative Example 11. Comparative Example 11 contains 0.5712 g/L of Pt and 0.2344 g/L of Rh in the catalyst layers, respectively.

Comparative Example 12

A cerium-zirconium composite oxide particle consisting of 90% cerium and 10% zirconium was used as a first compound. The particle was impregnated with dinitroamine Pt to prepare a cerium-zirconium composite oxide particle carrying 0.85% Pt (hereinafter referred to as "cerium-zirconium composite oxide particle A7").

18 g of cerium acetylacetonate for cerium oxide and 13.5 g of zirconium acetylacetonate for zirconium oxide were added to about 58.5 g of aluminum isopropoxide for $Al_2O_3$ dissolved in 2-methyl-2,4-pentanediol, followed by addition of 90 g of the particle A7 and hydrolysis with water. Water and organic materials including 2-methyl-2,4-pentanediol and the like were dried by evaporation, and then fired to prepare Powder a-29 comprising the particle A7 coated with alumina.

A ball mill was charged with 168 g of Powder a-29 and 7 g of boehmite alumina. Then, Powder a-29 was pulverized, with 307.5 g of water and 17.5 g of 10% nitric acid solution supplied to the ball mill, thereby obtaining a slurry having an average particle diameter of 3 μm (Slurry a-37).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Then, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-37 was coated at a density of 140 g/L and dried on a honeycomb type substrate (volume: 0.04 liters) having a diameter of 36φ, 400 cells and 6 mils. Then, Slurry b-9 was coated at a density of 60 g/L thereon, followed by drying and firing at 400° C., thereby preparing a catalyst sample of Comparative Example 12. Comparative Example 12 contains 0.5712 g/L of Pt and 0.2344 g/L of Rh in the catalyst layers, respectively.

Comparative Examples 13 and 14 are to be compared with Examples 28 to 31.

Comparative Example 13

A cerium-zirconium composite oxide particle consisting of 60% cerium and 40% zirconium was used as a first compound. The particle was impregnated with dinitroamine Pt to prepare a cerium-zirconium composite oxide particle carrying 0.85% Pt (hereinafter referred to as "cerium-zirconium composite oxide particle A6").

0.9 g of lanthanum acetate for lanthanum oxide was added to about 89.1 g of aluminum isopropoxide for $Al_2O_3$ dissolved in 2-methyl-2,4-pentanediol, followed by addition of 90 g of the particle A6 and hydrolysis with water. Water and organic materials including 2-methyl-2,4-pentanediol and the like were dried by evaporation, and then fired to prepare Powder a-32 comprising the cerium-zirconium composite oxide particle A6 coated with alumina.

A ball mill was charged with 168 g of Powder a-32 and 7 g of boehmite alumina. Then, Powder a-32 was pulverized, with 307.5 g of water and 17.5 g of 10% nitric acid solution supplied to the ball mill, thereby obtaining a slurry having an average particle diameter of 3 μm (Slurry a-40).

Next, a zirconium-lanthanum composite oxide particle having an average particle diameter of 20 nm was impregnated with rhodium nitrate, thereby preparing Particle B carrying 0.814% rhodium. 90 g of Particle B was added to about 90 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-2 comprising Particle B coated with alumina.

Then, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-40 was coated at a density of 140 g/L and dried on a honeycomb type substrate (volume: 0.04 liters) having a diameter of 36φ, 400 cells and 6 mils. Then, Slurry b-9 was coated at a density of 60 g/L thereon, followed by drying and firing at 400° C., thereby preparing a catalyst sample of Comparative Example 13. Comparative Example 13 contains 0.5712 g/L of Pt and 0.2344 g/L of Rh in the catalyst layers, respectively.

Comparative Example 14

A cerium-zirconium composite oxide particle consisting of 90% cerium and 10% zirconium was used as a first compound. The particle was impregnated with dinitroamine Pt to prepare a cerium-zirconium composite oxide particle carrying 0.85% Pt (hereinafter referred to as "cerium-zirconium composite oxide particle A7").

13.5 g of lanthanum acetate for lanthanum oxide was added to about 76.5 g of aluminum isopropoxide for $A_2O_3$ dissolved in 2-methyl-2,4-pentanediol, followed by addition of 90 g of the particle A7 and hydrolysis with water. Water and organic materials including 2-methyl-2,4-pentanediol and the like were dried by evaporation, and then fired to prepare Powder a-33 comprising the cerium-zirconium composite oxide particle A7 coated with alumina.

A ball mill was charged with 168 g of Powder a-33 and 7 g of boehmite alumina. Then, Powder a-33 was pulverized, with 307.5 g of water and 17.5 g of 10% nitric acid solution supplied to the ball mill, thereby obtaining a slurry having an average particle diameter of 3 μm (Slurry a-41).

Next, a zirconium-lanthanum composite oxide particle having an average particle diameter of 20 nm was impregnated with rhodium nitrate, thereby preparing Particle B carrying 0.814% rhodium. 90 g of Particle B3 was added to about 90 g of aluminum isopropoxide for $Al_2O_3$ dissolved in 2-methyl-2,4-pentanediol, followed by hydrolysis with water, Water and organic materials including 2-methyl-2,4-pentanediol and the like were dried by evaporation, and then fired to prepare Powder b-2 comprising Particle B coated with alumina.

Then, a ball mill was charged with 168 g of Powder b-2 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-9).

Slurry a-41 was coated at a density of 140 g/L and dried on a honeycomb type substrate (volume: 0.04 liters) having a diameter of 36φ, 400 cells and 6 mils. Then, Slurry b-9 was coated at a density of 60 g/L thereon, followed by drying and firing at 400° C., thereby preparing a catalyst sample of Comparative Example 14. Comparative Example 14 contains 0.5712 g/L of Pt and 0.2344 g/L of Rh in the catalyst layers, respectively.

Comparative Examples 15 and 16 are to be compared with Examples 32 to 37.

Comparative Example 15

A cerium-zirconium composite oxide particle consisting of 60% cerium and 40% zirconium was used as a first compound. The particle was impregnated with dinitroamine Pt to prepare a cerium-zirconium composite oxide particle carrying 0.85% Pt (hereinafter referred to as "cerium-zirconium composite oxide particle A6").

0.9 g of lanthanum acetate for lanthanum oxide was added to about 89.1 g of aluminum isopropoxide for $Al_2O_3$ dissolved in 2-methyl-2,4-pentanediol, followed by addition of 90 g of the particle A6 and hydrolysis with water. Water and organic materials including 2-methyl-2,4-pentanediol and the like were dried by evaporation, and then fired to prepare Powder a-32 comprising the cerium-zirconium composite oxide particle A6 coated with alumina.

A ball mill was charged with 168 g of Powder a-32 and 7 g of boehmite alumina. Thereafter, Powder a-32 was pulverized, with 307.5 g of water and 17.5 g of 10% nitric acid solution supplied to the ball mill, thereby obtaining a slurry having an average particle diameter of 3 μm (Slurry a-40).

Next, a zirconium-lanthanum (99:1) composite oxide particle having an average particle diameter of 20 nm was impregnated with rhodium nitrate, thereby preparing Particle B16 carrying 0.50875% rhodium. 144 g of Particle B16 was added to about 36 g of aluminum isopropoxide for $Al_2O_3$ dissolved in 2-methyl-2,4-pentanediol, followed by hydrolysis with water. Water and organic materials including 2-methyl-2,4-pentanediol and the like were dried by evaporation, and then fired to prepare Powder b-16 comprising Particle B16 coated with alumina.

Thereafter, a ball mill was charged with 168 g of Powder b-16 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-44).

Slurry a-40 was coated at a density of 140 g/L and dried on a honeycomb type substrate (volume: 0.04 liters) having a diameter of 36φ, 400 cells and 6 mils. Then, Slurry b-44 was coated at a density of 60 g/L thereon, followed by drying and firing at 400° C., thereby preparing a catalyst sample of Comparative Example 15. Comparative Example 15 contains 0.5712 g/L of Pt and 0.2344 g/L of Rh in the catalyst layers, respectively.

Comparative Example 16

A cerium-zirconium composite oxide particle consisting of 90% cerium and 10% zirconium was used as a first compound. The particle was impregnated with dinitroamine Pt to prepare a cerium-zirconium composite oxide particle carrying 0.85% Pt (hereinafter referred to as "cerium-zirconium composite oxide particle A7").

13.5 g of lanthanum acetate for lanthanum oxide was added to about 76.5 g of aluminum isopropoxide for $Al_2O_3$ dissolved in 2-methyl-2,4-pentanediol, followed by addition of 90 g of the particle A7 and hydrolysis with water. Water and organic materials including 2-methyl-2,4-pentanediol and the like were dried by evaporation, and then fired to prepare Powder a-33 comprising the cerium-zirconium composite oxide particle A7 coated with alumina.

A ball mill was charged with 168 g of Powder a-33 and 7 g of boehmite alumina. Then, Powder a-33 was pulverized, with 307.5 g of water and 17.5 g of 10% nitric acid solution supplied to the ball mill, thereby obtaining a slurry having an average particle diameter of 3 μm (Slurry a-41).

Next, a zirconium-lanthanum (99:1) composite oxide particle having an average particle diameter of 20 nm was impregnated with rhodium nitrate, thereby preparing Particle B17 carrying 1.356% rhodium. 54 g of Particle B17 was added to about 126 g of aluminum isopropoxide for $Al_2O_3$ dissolved in 2-methyl-2,4-pentanediol, followed by hydrolysis with water, Water and organic materials including 2-methyl-2,4-pentanediol and the like were dried by evaporation, and then fired to prepare Powder b-16 comprising Particle B17 coated with alumina.

Thereafter, a ball mill was charged with 168 g of Powder b-17 and 7 g of boehmite alumina, followed by pulverization with 307.5 g of water and 17.5 g of 10% nitric acid solution supplied to the ball mill, thereby obtaining a slurry having an average particle diameter of 3 μm (Slurry b-45).

Slurry a-41 was coated at a density of 140 g/L and dried on a honeycomb type substrate (volume: 0.04 liters) having a diameter of 36φ, 400 cells and 6 mils. Then, Slurry b-45 was coated at a density of 60 g/L thereon, followed by drying and firing at 400° C., thereby preparing a catalyst sample of Comparative Example 16. Comparative Example 16 contains 0.5712 g/L of Pt and 0.2344 g/L of Rh in the catalyst layers, respectively.

Five exhaust gas purifying catalysts of Examples 1 to 37 and Comparative Examples 1 to 16 were disposed on a piecebank in an exhaust system of a V-type engine having a displacement of 3500 cc. Thermal durability testing of the catalysts was performed under conditions of operating the engine for 30 hours using a Japanese regular-gasoline engine while maintaining a converter inlet temperature at 650° C.

After durability testing, with each of the catalysts assembled to a simulated engine exhaust system, the T50 Temperature, at which NOx, CO and HC($C_3H_6$) purification rates all equal 50%, was measured by supplying a simulated exhaust gas having a composition as shown in Table 1 to the simulated engine exhaust system while raising the catalyst temperature at a rate of 30° C./min.

TABLE 1

Reaction gas composition

| | |
|---|---|
| NO | 1000 ppm |
| $O_2$ | 0.60% |
| $H_2$ | 0.20% |
| HC ($C_3H_6$) | 1665 ppmC |
| CO | 0.60% |
| $CO_2$ | 15.50% |
| $H_2O$ | 10% |
| $N_2$ | Remaining amount |

Space speed: SV = 60000/h

Tables 2 through 9 show fine pore volumes obtained by Micromeritics in catalyst powder used for the catalysts of Examples 1 to 37 and Comparative Examples 1 to 16. A is the volume percent of fine pores having a pore diameter of 0.1 μm or less, and B is the volume percent of fine pores having a pore diameter of greater than 0.1 to 1 μm. The ratio of B to A is also recorded. Here, each pore was measured by mercury intrusion porosimetry for a specimen cut from a catalyst sample, which was produced to have catalyst layers formed on a honeycomb type substrate. Results are also shown in Tables 2 through 9.

Figure 4:
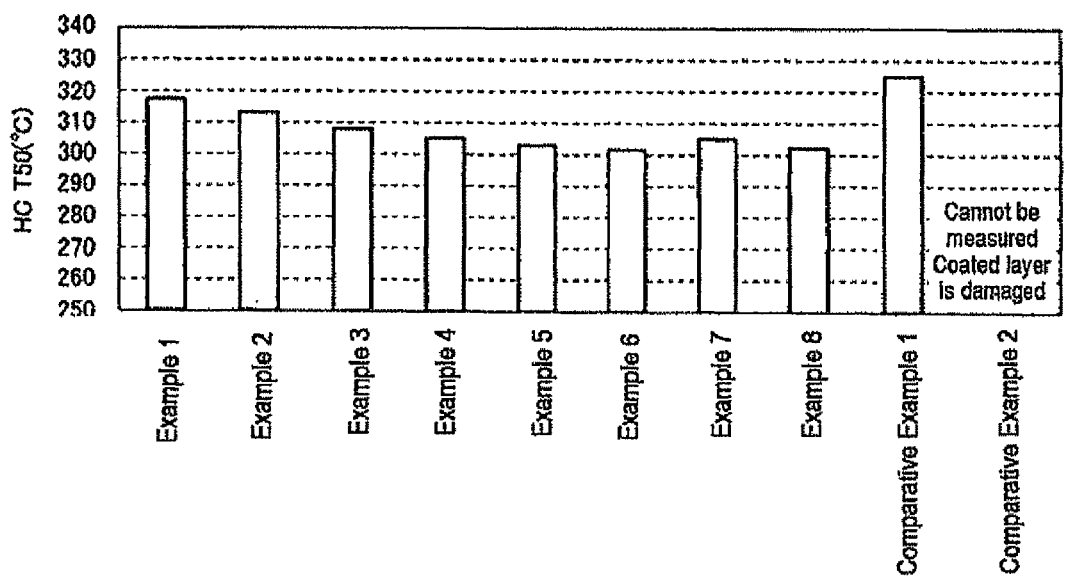
FIG. 4 is a graph depicting results of an HC T50 test for inventive and comparative examples.
Figure 5:
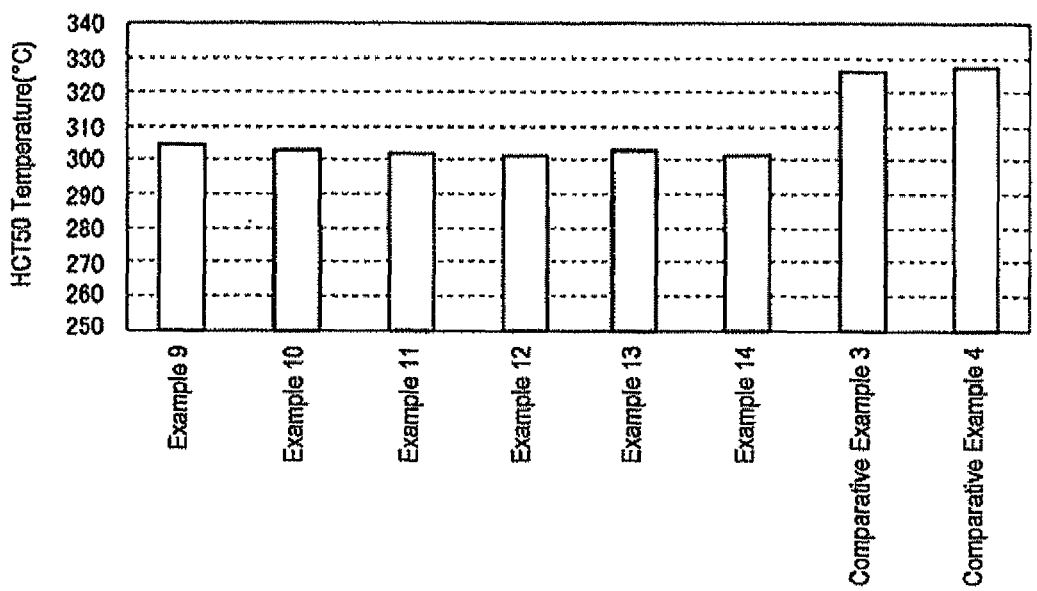
FIG. 5 is a graph depicting results of an HC T50 test for inventive and comparative examples.
Figure 6:
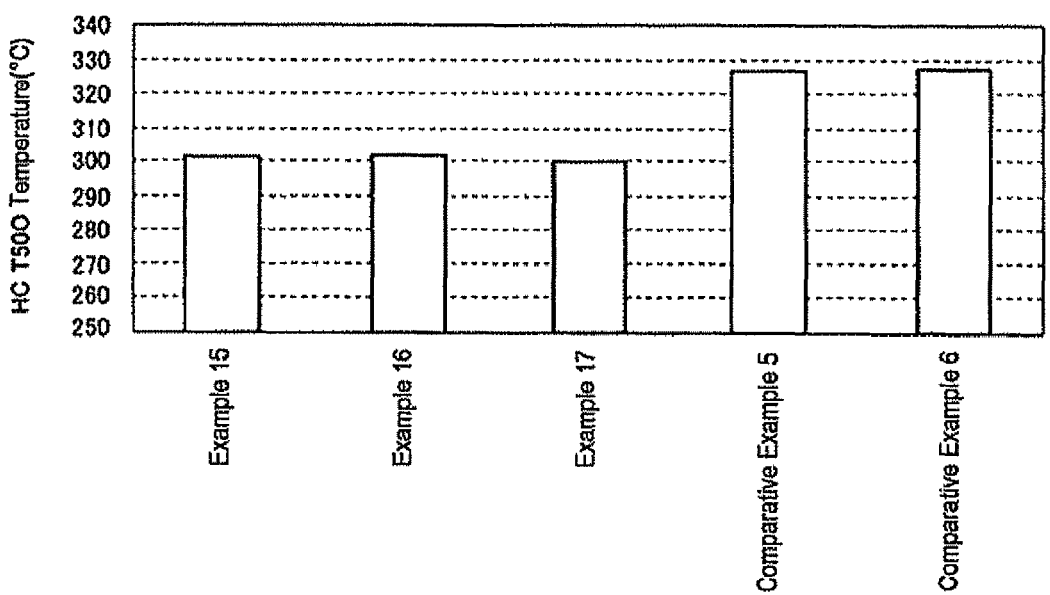
FIG. 6 is a graph depicting results of an HC T50 test for inventive and comparative examples.
Figure 7:
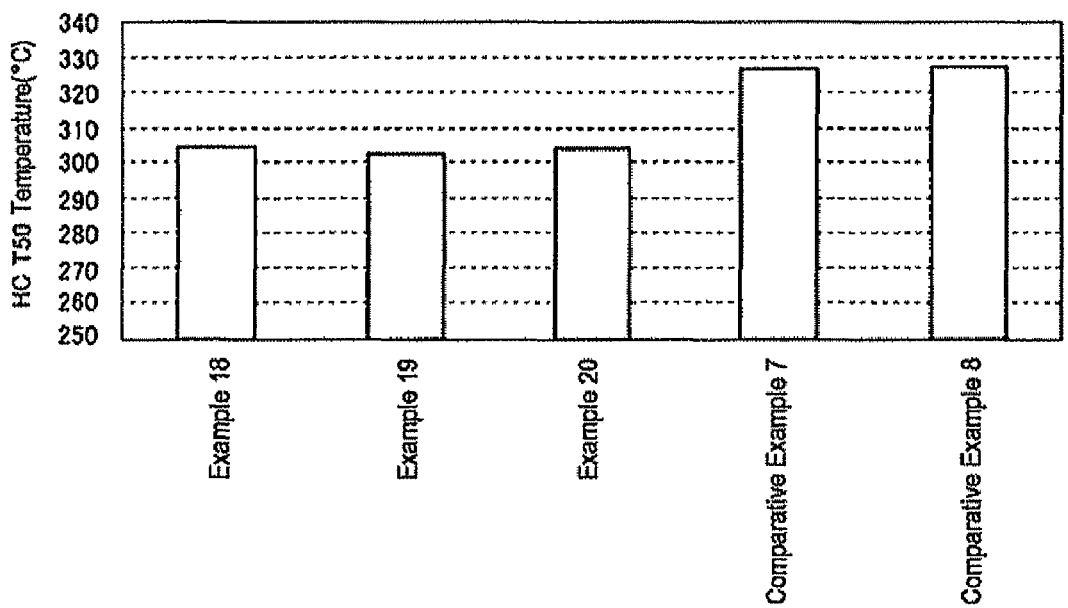
FIG. 7 is a graph depicting results of an HC T50 test for inventive and comparative examples.
Figure 8:
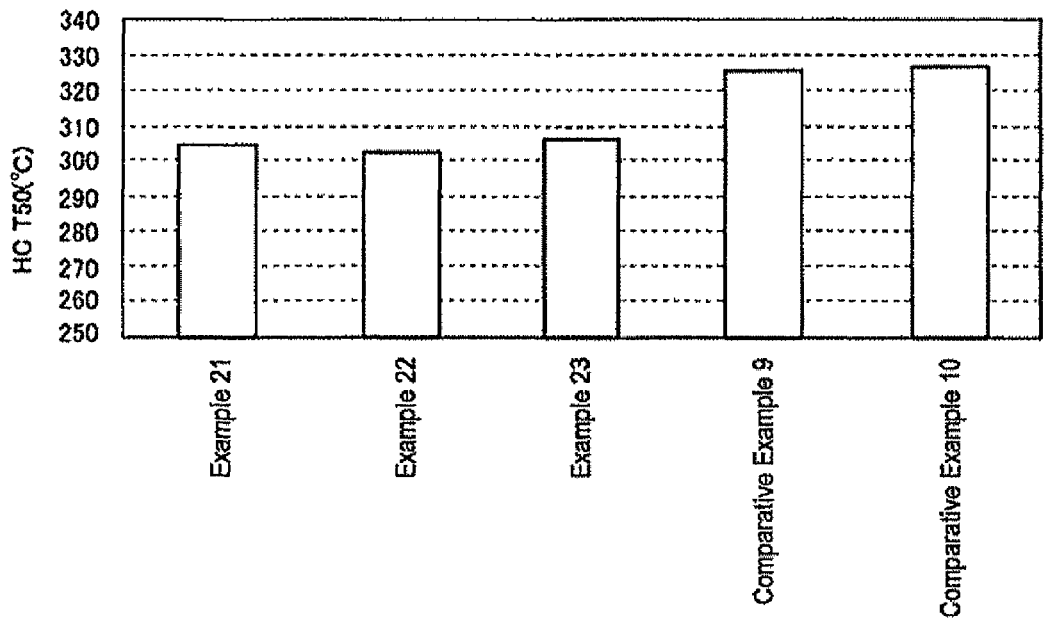
FIG. 8 is a graph depicting results of an HG T50 test for inventive and comparative examples.
Figure 9:
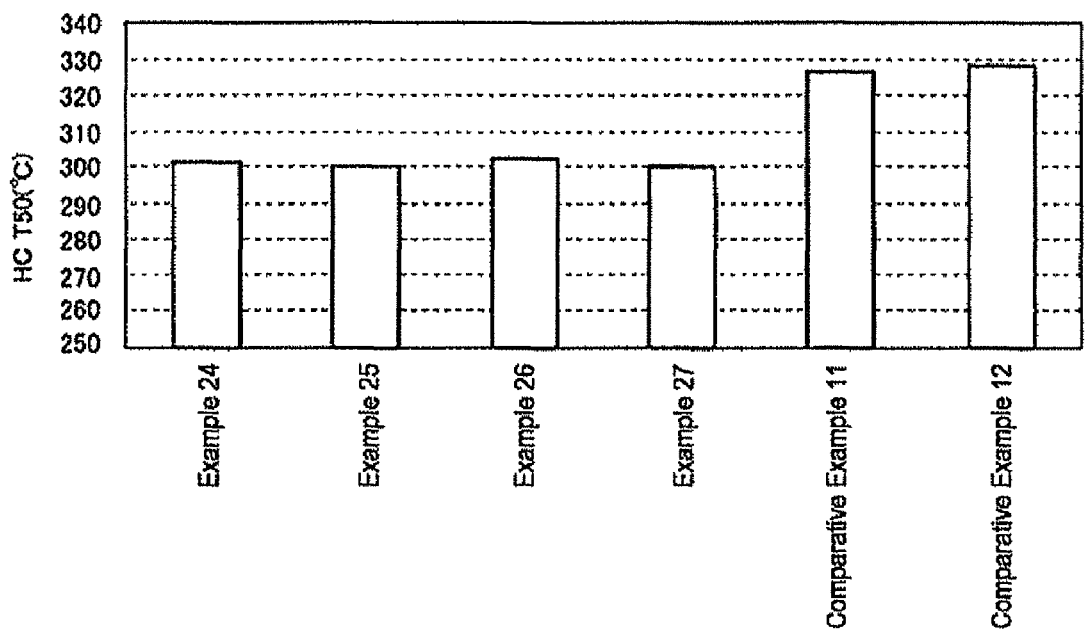
FIG. 9 is a graph depicting results of an HC T50 test for inventive and comparative examples.
Figure 10:
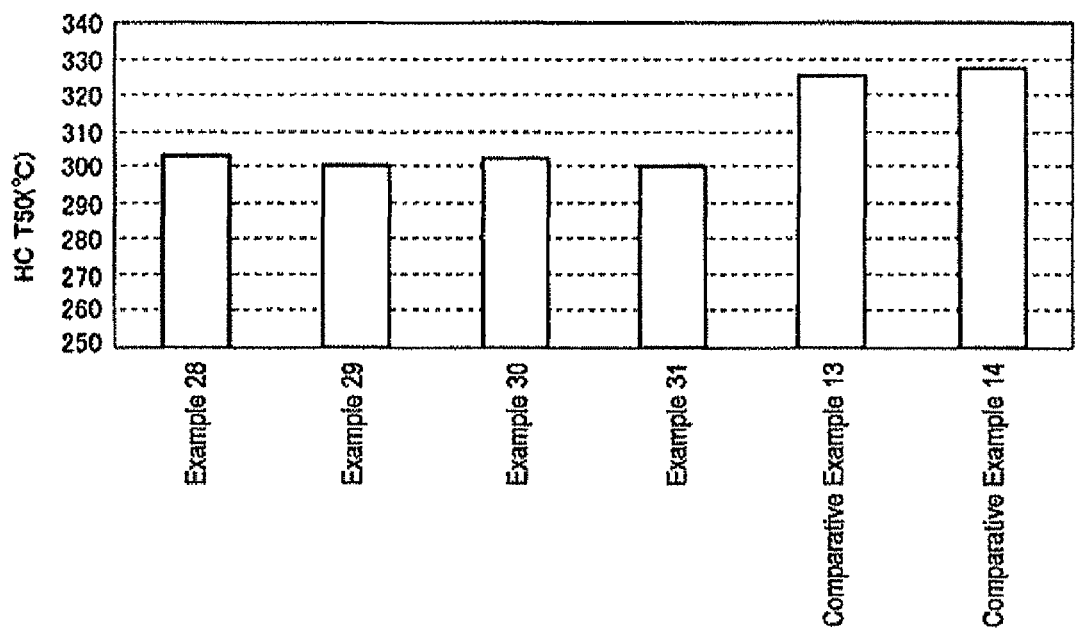
FIG. 10 is a graph depicting results of an HC T50 test for inventive and comparative examples.
Figure 11:
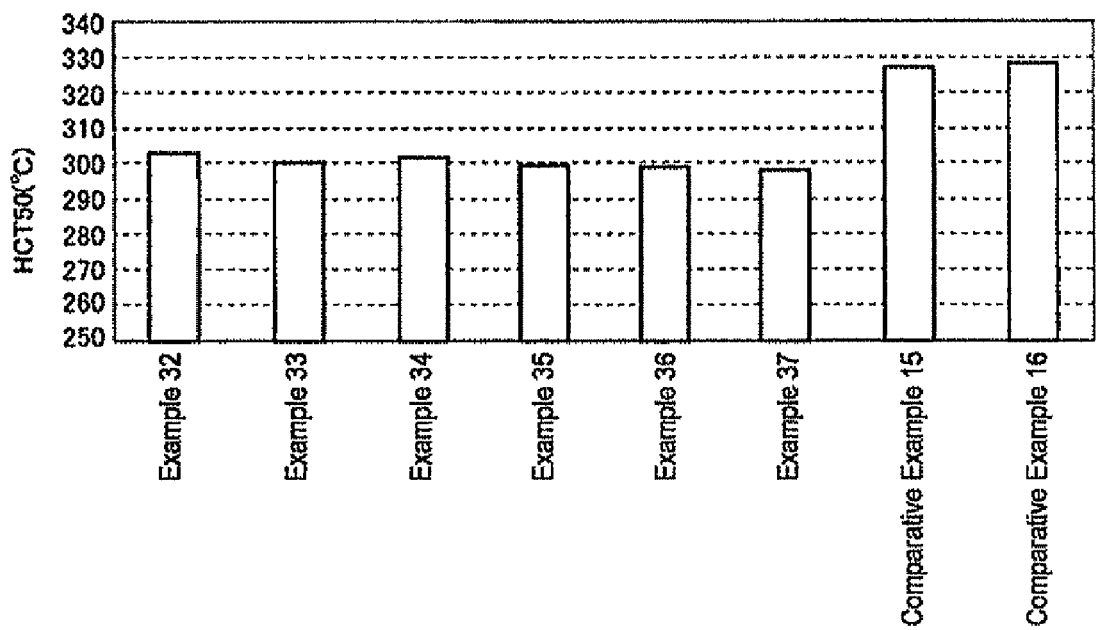
FIG. 11 is a graph depicting results of an HC T50 test for inventive and comparative examples.

FIGS. 4 through 11 show the T50 Temperatures of Examples 1 to 37 and Comparative Examples 1 to 16. This is the temperature at which HC($C_3H_6$) purification rate equaled 50%. FIG. 4 compares Examples 1 through 8 with Comparative Examples 1 and 2. FIG. 5 compares Examples 9 through 14 with Comparative Examples 3 and 4. FIG. 6 compares Examples 15 through 17 to Comparative Examples 5 and 5. FIG. 7 compares Examples 18 through 20 with Comparative Examples 7 and 8. FIG. 8 compares Examples 21 through 23 with Comparative Examples 9 and 10. FIG. 9 compares Examples 24-27 with comparative Examples 11 and 12. FIG. 10 compares Examples 28 through 31 with Comparative Examples 13 and 14. FIG. 11 compares Examples 32 through 37t with Comparative Examples 15 and 16.

TABLE 2

| | First layer | | | | Second layer | | | |
|---|---|---|---|---|---|---|---|---|
| Example | Noble metal | First compound | Second compound | Fine pore volume (cm³/g) | Noble metal | First compound | Second compound | Fine pore volume (cm³/g) |
| Example 1 | Pt | CeZr composite oxide | $Al_2O_3$ | 0.24 | Rh | ZrLa composite oxide | $Al_2O_3$ | 0.25 |
| Example 2 | Pt | CeZr composite oxide | $Al_2O_3$ | 0.24 | Rh | ZrLa composite oxide | $Al_2O_3$ | 0.25 |
| Example 3 | Pt | CeZr composite oxide | $Al_2O_3$ | 0.24 | Rh | ZrLa composite oxide | $Al_2O_3$ | 0.25 |
| Example 4 | Pt | CeZr composite oxide | $Al_2O_3$ | 0.24 | Rh | ZrLa composite oxide | $Al_2O_3$ | 0.25 |
| Example 5 | Pt | CeZr composite oxide | $Al_2O_3$ | 0.24 | Rh | ZrLa composite oxide | $Al_2O_3$ | 0.25 |
| Example 6 | Pt | CeZr composite oxide | $Al_2O_3$ | 0.24 | Rh | ZrLa composite oxide | $Al_2O_3$ | 0.25 |
| Example 7 | Pd | CeZr composite oxide | $Al_2O_3$ | 0.25 | Rh | ZrLa composite oxide | $Al_2O_3$ | 0.25 |
| Example 8 | Pd | CeZr composite oxide | $Al_2O_3$ | 0.25 | Rh | ZrLa composite oxide | $Al_2O_3$ | 0.25 |
| Comparative example 1 | Pt | CeZr composite oxide | $Al_2O_3$ | 0.21 | Rh | ZrLa composite oxide | $Al_2O_3$ | 0.22 |
| Comparative example 2 | Pt | CeZr composite oxide | $Al_2O_3$ | 0.21 | Rh | ZrLa composite oxide | $Al_2O_3$ | 0.22 |

| | Coated layer | | | NOx 50% | HC 50% | CO 50% |
|---|---|---|---|---|---|---|
| Example | Ratio of fine pore equal to or less than 0.1 μm A (%) | Ratio of fine pore of 0.1 μm-1 μm B (%) | B/A | Purifying temperature (° C.) | Purifying temperature (° C.) | Purifying temperature (° C.) |
| Example 1 | 89.7 | 10.3 | 0.1 | 311 | 317 | 312 |
| Example 2 | 79.9 | 20.1 | 0.3 | 307 | 313 | 308 |
| Example 3 | 68.7 | 31.3 | 0.5 | 302 | 308 | 303 |
| Example 4 | 59.2 | 40.8 | 0.7 | 299 | 305 | 300 |
| Example 5 | 49.5 | 50.5 | 1.0 | 297 | 303 | 298 |
| Example 6 | 40.3 | 59.7 | 1.5 | 295 | 301 | 296 |
| Example 7 | 69.0 | 31.0 | 0.4 | 299 | 305 | 300 |
| Example 8 | 59.0 | 41.0 | 0.7 | 296 | 302 | 297 |
| Comparative example 1 | 91.3 | 8.7 | 0.1 | 320 | 325 | 321 |
| Comparative example 2 | 35.0 | 65.0 | 1.9 | — | — | — |

TABLE 3

| | First layer | | | | Second layer | | | |
|---|---|---|---|---|---|---|---|---|
| Example | Noble metal | First compound | Second compound | Fine pore volume (cm³/g) | Noble metal | First compound | Second compound | Fine pore volume (cm³/g) |
| Example 9 | Pt | CeZr composite oxide | $Al_2O_3$ | 0.24 | Rh | ZrLa composite oxide | $Al_2O_3$ | 0.25 |
| Example 10 | Pt | CeZr composite oxide | $Al_2O_3$ | 0.34 | Rh | ZrLa composite oxide | $Al_2O_3$ | 0.33 |
| Example 11 | Pt | CeZr composite oxide | $Al_2O_3$ | 0.49 | Rh | ZrLa composite oxide | $Al_2O_3$ | 0.51 |

TABLE 3-continued

| | | | | | | | | |
|---|---|---|---|---|---|---|---|---|
| Example 12 | Pt | CeZr composite oxide | $Al_2O_3$ | 0.80 | Rh | ZrLa composite oxide | $Al_2O_3$ | 0.78 |
| Example 13 | Pd | CeZr composite oxide | $Al_2O_3$ | 0.33 | Rh | ZrLa composite oxide | $Al_2O_3$ | 0.32 |
| Example 14 | Pd | CeZr composite oxide | $Al_2O_3$ | 0.47 | Rh | ZrLa composite oxide | $Al_2O_3$ | 0.49 |
| Comparative example 3 | Pt | CeZr composite oxide | $Al_2O_3$ | 0.21 | Rh | ZrLa composite oxide | $Al_2O_3$ | 0.21 |
| Comparative example 4 | Pt | CeZr composite oxide | $Al_2O_3$ | 0.83 | Rh | ZrLa composite oxide | $Al_2O_3$ | 0.82 |

| | Coated layer | | | NOx 50% | HC 50% | CO 50% |
|---|---|---|---|---|---|---|
| Example | Ratio of fine pore equal to or less than 0.1 μm A (%) | Ratio of fine pore of 0.1 μm-1 μm B (%) | B/A | Purifying temperature (° C.) | Purifying temperature (° C.) | Purifying temperature (° C.) |
| Example 9 | 54.4 | 45.6 | 0.8 | 298 | 304 | 299 |
| Example 10 | 56.3 | 43.7 | 0.8 | 297 | 303 | 298 |
| Example 11 | 59.2 | 40.8 | 0.7 | 296 | 302 | 297 |
| Example 12 | 62.5 | 37.5 | 0.6 | 295 | 301 | 296 |
| Example 13 | 56.7 | 43.3 | 0.8 | 297 | 303 | 298 |
| Example 14 | 59.0 | 41.0 | 0.7 | 296 | 302 | 297 |
| Comparative example 3 | 91.1 | 8.9 | 0.1 | 320 | 326 | 322 |
| Comparative example 4 | 91.3 | 8.7 | 0.1 | 322 | 327 | 321 |

TABLE 4

| | First layer | | | | Second layer | | |
|---|---|---|---|---|---|---|---|
| Example | Noble metal | First compound ($CeO_2$:$ZrO_2$) (%) | Second compound | Fine pore volume ($cm^3$/g) | Noble metal | First compound ($ZrO_2$:$La_2O_3$) (%) | Second compound | Fine pore volume ($cm^3$/g) |
| Example 15 | Pt | CeZr composite oxide 70:30 | $Al_2O_3$ | 0.49 | Rh | ZrLa composite oxide 90:10 | $Al_2O_3$ | 0.51 |
| Example 16 | Pt | CeZr composite oxide 78:22 | $Al_2O_3$ | 0.50 | Rh | ZrLa composite oxide 95:5 | $Al_2O_3$ | 0.52 |
| Example 17 | Pt | CeZr composite oxide 85:15 | $Al_2O_3$ | 0.49 | Rh | ZrLa composite oxide 99:1 | $Al_2O_3$ | 0.51 |
| Comparative example 5 | Pt | CeZr composite oxide 60:40 | $Al_2O_3$ | 0.23 | Rh | ZrLa composite oxide 80:20 | $Al_2O_3$ | 0.22 |
| Comparative example 6 | Pt | CeZr composite oxide 90:10 | $Al_2O_3$ | 0.22 | Rh | ZrLa composite oxide 100:0 | $Al_2O_3$ | 0.22 |

| | Coated layer | | | NOx 50% | HC 50% | CO 50% |
|---|---|---|---|---|---|---|
| Example | Ratio of fine pore equal to or less than 0.1 μm A (%) | Ratio of fine pore of 0.1 μm-1 μm B (%) | B/A | Purifying temperature (° C.) | Purifying temperature (° C.) | Purifying temperature (° C.) |
| Example 15 | 59.2 | 40.8 | 0.7 | 295 | 301 | 296 |
| Example 16 | 60.3 | 39.7 | 0.7 | 296 | 302 | 297 |
| Example 17 | 59.0 | 41.0 | 0.7 | 294 | 300 | 295 |
| Comparative example 5 | 91.1 | 8.9 | 0.1 | 321 | 327 | 322 |
| Comparative example 6 | 91.3 | 8.7 | 0.1 | 322 | 328 | 322 |

TABLE 5

| | First layer | | | | Second layer | | |
|---|---|---|---|---|---|---|---|
| Example | Noble metal | First compound | Second compound ($CeO_2$, $ZrO_2$ (%)) | Fine pore volume ($cm^3$/g) | Noble metal | First compound | Second compound | Fine pore volume ($cm^3$/g) |
| Example 18 | Pt | CeZr composite oxide | $Al_2O_3$ 5 (%), 10 (%) | 0.27 | Rh | ZrLa composite oxide | $Al_2O_3$ | 0.26 |
| Example 19 | Pt | CeZr composite oxide | $Al_2O_3$ 10 (%), 5 (%) | 0.31 | Rh | ZrLa composite oxide | $Al_2O_3$ | 0.26 |
| Example 20 | Pt | CeZr composite oxide | $Al_2O_3$ 15 (%), 3 (%) | 0.28 | Rh | ZrLa composite oxide | $Al_2O_3$ | 0.26 |

TABLE 5-continued

| | | | | | | | | | |
|---|---|---|---|---|---|---|---|---|---|
| Comparative example 7 | Pt | CeZr composite oxide | $Al_2O_3$ 2 (%), 1 (%) | 0.22 | Rh | ZrLa composite oxide | $Al_2O_3$ | | 0.22 |
| Comparative example 8 | Pt | CeZr composite oxide | $Al_2O_3$ 20 (%), 15 (%) | 0.21 | Rh | ZrLa composite oxide | $Al_2O_3$ | | 0.22 |

| | Coated layer | | | NOx 50% | HC 50% | CO 50% |
|---|---|---|---|---|---|---|
| Example | Ratio of fine pore equal to or less than 0.1 μm A (%) | Ratio of fine pore of 0.1 μm-1 μm B (%) | B/A | Purifying temperature (° C.) | Purifying temperature (° C.) | Purifying temperature (° C.) |
| Example 18 | 55.7 | 44.3 | 0.8 | 298 | 304 | 299 |
| Example 19 | 57.3 | 42.7 | 0.7 | 297 | 303 | 298 |
| Example 20 | 56.5 | 43.5 | 0.8 | 298 | 304 | 299 |
| Comparative example 7 | 91.2 | 8.8 | 0.1 | 320 | 326 | 321 |
| Comparative example 8 | 91.3 | 8.7 | 0.1 | 323 | 327 | 323 |

TABLE 6

| | First layer | | | | Second layer | | | |
|---|---|---|---|---|---|---|---|---|
| Example | Noble metal | First compound | Second compound ($La_2O_3$ (%)) | Fine pore volume ($cm^3/g$) | Noble metal | First compound | Second compound | Fine pore volume ($cm^3/g$) |
| Example 21 | Pt | CeZr composite oxide | $Al_2O_3$ 3 (%) | 0.25 | Rh | ZrLa composite oxide | $Al_2O_3$ | 0.26 |
| Example 22 | Pt | CeZr composite oxide | $Al_2O_3$ 5 (%) | 0.28 | Rh | ZrLa composite oxide | $Al_2O_3$ | 0.26 |
| Example 23 | Pt | CeZr composite oxide | $Al_2O_3$ 10 (%) | 0.30 | Rh | ZrLa composite oxide | $Al_2O_3$ | 0.26 |
| Comparative example 9 | Pt | CeZr composite oxide | $Al_2O_3$ 1 (%) | 0.22 | Rh | ZrLa composite oxide | $Al_2O_3$ | 0.22 |
| Comparative example 10 | Pt | CeZr composite oxide | $Al_2O_3$ 15 (%) | 0.22 | Rh | ZrLa composite oxide | $Al_2O_3$ | 0.22 |

| | Coated layer | | | NOx 50% | HC 50% | CO 50% |
|---|---|---|---|---|---|---|
| Example | Ratio of fine pore equal to or less than 0.1 μm A (%) | Ratio of fine pore of 0.1 μm-1 μm B (%) | B/A | Purifying temperature (° C.) | Purifying temperature (° C.) | Purifying temperature (° C.) |
| Example 21 | 54.8 | 45.2 | 0.8 | 299 | 305 | 300 |
| Example 22 | 57.2 | 42.8 | 0.7 | 297 | 303 | 298 |
| Example 23 | 58.5 | 41.5 | 0.7 | 300 | 306 | 301 |
| Comparative example 9 | 91.3 | 8.7 | 0.1 | 319 | 325 | 320 |
| Comparative example 10 | 91.1 | 8.9 | 0.1 | 320 | 326 | 321 |

TABLE 7

| Example | Existence or nonexistence of undercoat and material thereof | Interlayer | | | |
|---|---|---|---|---|---|
| | | Noble metal | First compound ($CeO_2:ZrO_2$) | Second compound ($CeO_2$, $ZrO_2$ (%)) | Fine pore volume ($cm^3/g$) |
| Example 24 | Existence: alumina | Pt | CeZr composite oxide 78:22 | $Al_2O_3$ 10 (%), 5 (%) | 0.31 |
| Example 25 | Existence: β-zeolite | Pt | CeZr composite oxide 78:22 | $Al_2O_3$ 10 (%), 5 (%) | 0.31 |
| Example 26 | Existence: alumina | Pd | CeZr composite oxide 78:22 | $Al_2O_3$ 10 (%), 5 (%) | 0.30 |
| Example 27 | Existence: β-zeolite | Pd | CeZr composite oxide 78:22 | $Al_2O_3$ 10 (%), 5 (%) | 0.30 |
| Comparative example 11 | Nonexistence | Pt | CeZr composite oxide 60:40 | $Al_2O_3$ 2 (%), 1 (%) | 0.22 |
| Comparative example 12 | Nonexistence | Pt | CeZr composite oxide | $Al_2O_3$ | 0.21 |

TABLE 7-continued

| | | 90:10 | 20 (%), 15 (%) | |
|---|---|---|---|---|

| | Surface layer | | | |
|---|---|---|---|---|
| Example | Noble metal | First compound | Second compound | Fine pore volume(cm$^3$/g) |
| Example 24 | Rh | ZrLa composite oxide | Al$_2$O$_3$ | 0.26 |
| Example 25 | Rh | ZrLa composite oxide | Al$_2$O$_3$ | 0.26 |
| Example 26 | Rh | ZrLa composite oxide | Al$_2$O$_3$ | 0.26 |
| Example 27 | Rh | ZrLa composite oxide | Al$_2$O$_3$ | 0.26 |
| Comparative example 11 | Rh | ZrLa composite oxide | Al$_2$O$_3$ | 0.22 |
| Comparative example 12 | Rh | ZrLa composite oxide | Al$_2$O$_3$ | 0.22 |

| | Coated layer | | | NOx 50% | HC 50% | CO 50% |
|---|---|---|---|---|---|---|
| Example | Ratio of fine pore equal to or less than 0.1 μm A (%) | Ratio of fine pore of 0.1 μm~1 μm B (%) | B/A | Purifying temperature (° C.) | Purifying temperature (° C.) | Purifying temperature (° C.) |
| Example 24 | 60.5 | 39.5 | 0.7 | 295 | 301 | 296 |
| Example 25 | 62.4 | 37.6 | 0.6 | 294 | 300 | 295 |
| Example 26 | 61.7 | 38.3 | 0.6 | 297 | 302 | 297 |
| Example 27 | 64.9 | 35.1 | 0.5 | 295 | 300 | 295 |
| Comparative example 11 | 91.2 | 8.8 | 0.1 | 323 | 327 | 322 |
| Comparative example 12 | 91.3 | 8.7 | 0.1 | 324 | 328 | 324 |

TABLE 8

| Example | Existence or nonexistence of undercoat and material thereof | Noble metal | Interlayer First compound (CeO$_2$:ZrO$_2$) | Second compound (La$_2$O$_3$ (%)) | Fine pore volume (cm$^3$/g) |
|---|---|---|---|---|---|
| Example 28 | Existence: alumina | Pt | CeZr composite oxide 78:22 | Al$_2$O$_3$ 5 (%) | 0.28 |
| Example 29 | Existence: β-zeolite | Pt | CeZr composite oxide 78:22 | Al$_2$O$_3$ 5 (%) | 0.28 |
| Example 30 | Existence: alumina | Pd | CeZr composite oxide 78:22 | Al$_2$O$_3$ 5 (%) | 0.28 |
| Example 31 | Existence: β-zeolite | Pd | CeZr composite oxide 78:22 | Al$_2$O$_3$ 5 (%) | 0.28 |
| Comparative example 13 | Nonexistence | Pt | CeZr composite oxide 60:40 | Al$_2$O$_3$ 1 (%) | 0.22 |
| Comparative example 14 | Nonexistence | Pt | CeZr composite oxide 90:10 | Al$_2$O$_3$ 15 (%) | 0.22 |

| | Surface layer | | | |
|---|---|---|---|---|
| Example | Noble metal | First compound | Second compound | Fine pore volume (cm$^3$/g) |
| Example 28 | Rh | ZrLa composite oxide | Al$_2$O$_3$ | 0.27 |
| Example 29 | Rh | ZrLa composite oxide | Al$_2$O$_3$ | 0.26 |
| Example 30 | Rh | ZrLa composite oxide | Al$_2$O$_3$ | 0.25 |
| Example 31 | Rh | ZrLa composite oxide | Al$_2$O$_3$ | 0.26 |
| Comparative example 13 | Rh | ZrLa composite oxide | Al$_2$O$_3$ | 0.21 |
| Comparative example 14 | Rh | ZrLa composite oxide | Al$_2$O$_3$ | 0.23 |

| | Coated layer | | | NOx 50% | HC 50% | CO 50% |
|---|---|---|---|---|---|---|
| Example | Ratio of fine pore equal to or less than 0.1 μm A (%) | Ratio of fine pore of 0.1 μm-1 μm B (%) | B/A | Purifying temperature (° C.) | Purifying temperature (° C.) | Purifying temperature (° C.) |
| Example 28 | 59.9 | 40.1 | 0.7 | 297 | 303 | 298 |
| Example 29 | 61.7 | 38.3 | 0.6 | 294 | 300 | 295 |
| Example 30 | 58.6 | 41.4 | 0.7 | 296 | 302 | 297 |
| Example 31 | 63.3 | 36.7 | 0.6 | 293 | 299 | 294 |
| Comparative example 13 | 91.2 | 8.8 | 0.1 | 320 | 326 | 321 |
| Comparative example 14 | 91.1 | 8.9 | 0.1 | 321 | 327 | 322 |

TABLE 9

| Example | Existence or nonexistence of undercoat and material thereof | Noble metal | Interlayer First compound (CeO$_2$:ZrO$_2$) | Second compound (La$_2$O$_3$ (%)) | Fine pore volume (cm$^3$/g) |
|---|---|---|---|---|---|
| Example 32 | Existence: alumina | Pt | CeZr composite oxide 78:22 | Al$_2$O$_3$ 5 (%) | 0.28 |
| Example 33 | Existence: alumina | Pt | CeZr composite oxide 78:22 | Al$_2$O$_3$ 5 (%) | 0.28 |
| Example 34 | Existence: alumina | Pt | CeZr composite oxide 78:22 | Al$_2$O$_3$ 5 (%) | 0.28 |
| Example 35 | Existence: alumina | Pd | CeZr composite oxide 78:22 | Al$_2$O$_3$ 5 (%) | 0.29 |
| Example 36 | Existence: β-zeolite | Pt | CeZr composite oxide 78:22 | Al$_2$O$_3$ 5 (%) | 0.28 |
| Example 37 | Existence: β-zeolite | Pd | CeZr composite oxide 78:22 | Al$_2$O$_3$ 5 (%) | 0.29 |
| Comparative example 15 | Nonexistence | Pt | CeZr composite oxide 60:40 | Al$_2$O$_3$ 1 (%) | 0.22 |
| Comparative example 16 | Nonexistence | Pt | CeZr composite oxide 90:10 | Al$_2$O$_3$ 15 (%) | 0.22 |

| Example | Surface layer Noble metal | First compound (%) | Second compound (%) | Fine pore volume (cm$^3$/g) |
|---|---|---|---|---|
| Example 32 | Rh | ZrLa composite oxide 40 | Al$_2$O$_3$ 60 | 0.28 |
| Example 33 | Rh | ZrLa composite oxide 70 | Al$_2$O$_3$ 30 | 0.26 |
| Example 34 | Rh | ZrLa composite oxide 75 | Al$_2$O$_3$ 25 | 0.25 |
| Example 35 | Rh | ZrLa composite oxide 70 | Al$_2$O$_3$ 30 | 0.26 |
| Example 36 | Rh | ZrLa composite oxide 70 | Al$_2$O$_3$ 30 | 0.26 |
| Example 37 | Rh | ZrLa composite oxide 70 | Al$_2$O$_3$ 30 | 0.26 |
| Comparative example 15 | Rh | ZrLa composite oxide 80 | Al$_2$O$_3$ 20 | 0.20 |
| Comparative example 16 | Rh | ZrLa composite oxide 30 | Al$_2$O$_3$ 70 | 0.23 |

| Example | Coated layer Ratio of fine pore equal to or less than 0.1 μm A (%) | Ratio of fine pore of 0.1 μm-1 μm B (%) | B/A | NOx 50% Purifying temperature (° C.) | HC 50% Purifying temperature (° C.) | CO 50% Purifying temperature (° C.) |
|---|---|---|---|---|---|---|
| Example 32 | 59.9 | 40.1 | 0.7 | 297 | 303 | 298 |
| Example 33 | 58.7 | 41.3 | 0.7 | 294 | 300 | 295 |
| Example 34 | 57.2 | 42.8 | 0.7 | 296 | 302 | 297 |
| Example 35 | 58.4 | 41.6 | 0.7 | 293 | 299 | 294 |
| Example 36 | 61.5 | 38.5 | 0.6 | 293 | 299 | 294 |
| Example 37 | 61.8 | 38.2 | 0.6 | 292 | 298 | 293 |
| Comparative example 15 | 91.1 | 8.9 | 0.1 | 321 | 327 | 322 |
| Comparative example 16 | 91.2 | 8.8 | 0.1 | 322 | 328 | 323 |

* ZrLa in ZrLa composite oxide = 99:1 (%)

Although Comparative Example 1 shown in Table 2 and FIG. 4 contained alumina provided from aluminum isopropoxide as the second compound of the first catalyst layer and aluminum isopropoxide as the second compound of the second catalyst layer, Comparative Example 1 had smaller fine pore volumes of the catalyst powder in the first and second catalyst layers than any other examples. In addition, the percentage of fine pore volume of the fine pores having a fine pore diameter of greater than 0.1 to 1 μm was a low value of 9.3%. When observing Pt particles via TEM after durability testing, the Pt particles had a particle diameter of about 10 nm, thus resulting in low levels of coagulation of the Pt particles. Coagulation of Rh particles was also low. However, Comparative Example 1 exhibited low catalyst activity. Without being bound to any theory, it is believed that this low catalyst activity was caused by the low fine pore volume and resultant difficulty in exhaust gas passing through the catalyst powder and reaching the Pt particles, irrespective of the small particle diameter of Pt particles.

For Comparative Example 2 shown in Table 2 and FIG. 4, the catalyst layers were formed of the same catalyst powder as in Comparative Example 1 and the percentage of fine pore volume of the fine pores having the fine pore diameter of greater than 0.1 to 1 μm was a high value of 65%. When observing the coated catalyst layers after the durability test, since the coated catalyst layers were disrupted, evaluation of the coated catalyst layers could not be performed. Without being bound to theory, it is believed that such a phenomenon was caused by an excessively large amount of pores that led to the strength reduction of the catalyst layers. In contrast, for Examples 1 to 6, 9 to 12, 15 to 25, 28, 29, 32 to 34 and 36, all of which contain Pt as the noble metal in the first catalyst layer, Pt particles, after the durability test, had a particle diameter of about 10 nm and coagulation of the Pt particles was low. Rh particles had a particle diameter of about 6 nm, thus indicating low levels of coagulation of the Rh particles.

For Examples 7, 8, 13, 14, 26, 27, 30, 31, 35 and 37, all of which contain Pd as the noble metal in the first catalyst layer, Pd particles, after the durability test, had a particle diameter of about 10 nm and coagulation of the Pd particles was low. Rh particles had a particle diameter of about 6 nm, thus indicating low levels of coagulation of the Rh particles.

The catalyst activities of the inventive examples were much better and significantly higher than the comparative examples.

For Comparative Example 3 shown in Table 3 and FIG. 5, the cerium-zirconium compound used as the first compound in the first catalyst layer had a fine pore volume of 0.15 cm$^3$/g and the zirconium-lanthanum composite oxide particle used as the first compound in the second catalyst layer had a fine pore volume of 0.16 cm$^3$/g. Comparative Example 3 exhibited low catalyst activity.

Comparative Example 4 shown in Table 3 and FIG. 5 used alumina particles having a particle diameter of 130 nm for the second compounds of the first and second catalyst layers. As a result, Comparative Example 4 had a large fine pore volume. When observing Pt particles via TEM after the durability test, the Pt particles had a particle diameter of about 20 nm or more, from which coagulation of Pt particles could be confirmed. In addition, coagulation of the cerium-zirconium composite oxide particles was also observed. Without being bound to theory, it is believed that this coagulation of the cerium-zirconium composite oxide particles was caused by a movement of the cerium-zirconium composite oxide particles carrying the Pt particles into large pores formed between the large alumina particles during the durability test. Coagulation of the Pt particles occurred along with the coagulation of the cerium-zirconium composite oxide particles, increasing the particle diameter of Pt particles. In addition, Rh particles in the second catalyst layer also increased in particle diameter to 15 nm. As a result, it is seen that Comparative Example 4 exhibited low catalyst activity irrespective of the large fine pore volume.

Comparative Examples 5 and 6 shown in Table 4 and FIG. 6 had different contents of cerium oxide and zirconium oxide for the first compounds of the first and second catalyst layers. For Comparative Example 5, the contents of cerium oxide and zirconium oxide in the first catalyst layer were 60% and 40%, and the contents of zirconium oxide and lanthanum oxide in the second catalyst layer were 80% and 20%, respectively. However, Comparative Example 5 had a lower catalyst activity than Examples 15, 16 and 17. Under observation via TEM, the particle diameter of Pt particles in the first catalyst layer was about 10 nm. Although Rh particles in the second catalyst layer had a low particle diameter of 6 nm, embedding of the Rh particles in coagulated zirconium-lanthanum composite oxide particles was observed.

For Comparative Example 6, the contents of cerium oxide and zirconium oxide in the first catalyst layer were 90% and 10%, respectively, and the second catalyst layer consisted of 100% zirconium oxide. However, Comparative Example 6 had a lower catalyst activity than Examples 15, 16 and 17. Under observation via TEM, the particle diameter of Pt particles in the first catalyst layer was about 10 nm. Although Rh particles in the second catalyst layer had a low particle diameter of 6 nm, embedding of the Rh particles in coagulated zirconium oxide particles was observed.

It is believed, without being bound by theory, that the low catalyst activity was caused by a decreased oxygen emitting capability of the composite oxide of cerium oxide and zirconium oxide in addition to a low fine pore volume in the catalyst layer of Comparative Example 6. Further, with these contents of zirconium oxide and lanthanum oxide, coagulation of the zirconium-lanthanum composite oxide particles is likely to occur, thus causing the Rh particles to be embedded in the zirconium-lanthanum composite oxide particles or in zirconium oxide particles. This makes it difficult for the exhaust gas to contact the Rh particles.

Further, it is believed that the low catalyst activity was caused by the low fine pore volume of the catalyst layer, which hindered the diffusion of the exhaust gas through the catalyst layer.

Comparative Examples 7 and 8 shown in Table 5 and FIG. 7 had lower catalyst activities than Examples 18, 19 and 20. When observing Pt particles of Comparative Examples 7 and 8 via TEM after the durability test, the Pt particles had a particle diameter of about 10 nm and coagulation of the Pt particles was low. Coagulation of Rh particles was also low. However, Comparative Examples 7 and 8 had low catalyst activities.

For Examples 18, 19 and 20, since the heat resistance of alumina after firing was improved by adding the cerium compound or the zirconium compound to the alumina precursor, the fine pore volume was remarkably maintained after the durability test. Since the fine pores having a particle diameter of greater than 0.1 to 1 μm were secured in the catalyst layer, these inventive examples exhibited good exhaust gas diffusion and maintained the catalyst activities.

For Comparative Examples 7 and 8, it is believed that since the fine pore volume could not be secured after the durability test and the catalyst layer had a low fine pore volume due to lack of effects relating to addition of the cerium compound or the zirconium compound, it was difficult for exhaust gas to reach the noble metal, thus resulting in low catalyst activities.

Comparative Examples 9 and 10 shown in Table 6 and FIG. 8 had lower catalyst activities than Examples 21, 22 and 23. When observing Pt particles of Comparative Examples 9 and 10 after the durability test via TEM, the Pt particles had a particle diameter of about 10 nm and coagulation of the Pt particles was low. Coagulation of Rh particles was also low. However, Comparative Examples 9 and 10 had low catalyst activities.

For Examples 21, 22 and 23, since the heat resistance of alumina after firing was improved by adding the lanthanum compound to the alumina precursor, the fine pore volume was remarkably maintained after the durability testing. Further, since the fine pores having a particle diameter of greater than 0.1 to 1 μm were secured in the catalyst layer, these inventive examples exhibited good exhaust gas diffusion and maintained the catalyst activity.

For Comparative Examples 9 and 10, since the fine pore volume could not be secured after the durability test and the catalyst layer had a low fine pore volume due to lack of effects relating to addition of the lanthanum compound, it was difficult for the exhaust gas to reach the noble metal, thus causing the low catalyst activities.

Comparative Examples 11 and 12 shown in Table 7 and FIG. 9 had lower catalyst activities than Examples 24, 25, 26 and 27. When observing Pt particles of Comparative Examples 11 and 12 after the durability test via TEM, the Pt particles had a particle diameter of about 10 nm and coagulation of the Pt particles was low. In addition, coagulation of Rh particles was also low. However, Comparative Examples 11 and 12 had low catalyst activities.

For Examples 24, 25, 26 and 27, the catalyst layer included three layers comprising a lowermost undercoat, an intermediate layer and a surface catalyst layer. With this configuration, the catalyst in the intermediate layer had a uniform coat thickness, thereby allowing effective operation of the catalyst. The surface catalyst layer also exhibited effective operation. Further, the heat resistance of alumina after firing was improved by the contents of cerium oxide and zirconium oxide and by the addition of the cerium compound or the zirconium compound to the alumina precursor. This is so that the fine pore volume was remarkably maintained after the durability test. Further, since the fine pores having a diameter of greater than 0.1 to 1 μm were secured in the catalyst layer, these inventive examples exhibited good exhaust gas diffusion and maintained the catalyst activity.

For Comparative Examples 11 and 12, it is believed that the low catalyst activities were caused by low oxygen emitting capabilities of the composite oxide of cerium oxide and zirconium oxide, failure in securing the fine pore volume after the durability test and a low fine pore volume in the catalyst layer due to the lack of effect relating to addition of the cerium compound or the zirconium compound to the aluminum precursor. This made it difficult for the exhaust gas to reach the noble metal.

Comparative Examples 13 and 14 shown in Table 8 and FIG. 10 had lower catalyst activities than Examples 28, 29, 30 and 31. When observing the Pt particles of Comparative Examples 13 and 14 after the durability test via TEM, the Pt particles had a particle diameter of about 10 nm and coagulation of the Pt particles was low. In addition, coagulation of Rh particles was also low. However, Comparative Examples 13 and 14 had low catalyst activities.

For Examples 28, 29, 30 and 31, the catalyst layer included three layers comprising a lowermost undercoat, an intermediate layer and a surface catalyst layer. With this configuration, the catalyst in the intermediate layer had a uniform coat thickness, thus allowing effective operation of the catalyst. The surface catalyst layer also exhibited effective operation. Further, the heat resistance of alumina after firing was improved by the contents of cerium oxide and zirconium oxide and by the addition of the lanthanum compound to the alumina precursor. This is so that the fine pore volume was remarkably maintained after the durability test. Also, since the fine pores having a diameter of greater than 0.1 to 1 μm were secured in the catalyst layer, these inventive examples exhibited good exhaust gas diffusion and maintained the catalyst activity.

For Comparative Examples 13 and 14, it is believed that the low catalyst activities were caused by low oxygen emitting capabilities of the composite oxide of cerium oxide and zirconium oxide, failure in securing the fine pore volume after the durability test, and a low fine pore volume in the catalyst layer due to the lack of effect relating to addition of the lanthanum compound to the aluminum precursor. This made it difficult for exhaust gas to reach the noble metal.

Comparative Examples 15 and 16 shown in Table 9 and FIG. 11 had lower catalyst activities than Examples 32, 33, 34, 35, 36 and 37.

When observing the Pt particles of Comparative Example 15 after the durability test via TEM, the Pt particles had a particle diameter of about 10 nm. Further, the Rh particles had a small particle diameter of about 6 nm, but were embedded in coagulated zirconium-lanthanum composite oxide particles. Comparative Example 15 had a low catalyst activity.

When observing the Pt particles of Comparative Example 16 after the durability test via TEM, the Pt particles had a particle diameter of about 10 nm, while the Rh particles had a small particle diameter of about 6 nm. However, Comparative Example 16 had a low catalyst activity.

For Examples 32, 33, 34, 35, 36 and 37, the catalyst layer included three layers comprising a lowermost undercoat, an intermediate layer and a surface catalyst layer. With this configuration, the catalyst in the intermediate layer had a uniform coat thickness, thus allowing effective operation of the catalyst. The surface catalyst layer also operated effectively. Further, the heat resistance of alumina after firing was improved by the contents of cerium oxide and zirconium oxide and by the addition of the lanthanum compound to the alumina precursor. This is so that the fine pore volume was remarkably maintained after durability testing. Further, these inventive examples had a good combinational ratio of the zirconium composite oxide and alumina in the surface layer. Since fine pores having a particle diameter of greater than 0.1 to 1 μm were secured in the catalyst layer, these inventive examples exhibited good exhaust gas diffusion and maintained the catalyst activity.

For Comparative Example 15, it is believed that the low catalyst activity was caused by low oxygen emitting capabilities of the composite oxide of cerium oxide and zirconium oxide, failure in securing the fine pore volume after the durability test due to the lack of effects relating to addition of the lanthanum compound to the alumina precursor, failure in securing the fine pore volume in the surface layer after the durability test, failure in suppressing coagulation of the zirconium composite oxide due to low alumina content, embedding of Rh particles in the zirconium composite oxide, which hindered diffusion of exhaust gas to the Rh particles, and a low fine pore volume in the catalyst layer This made it difficult for exhaust gas to reach the noble metal.

For Comparative Example 16, it is believed that the low catalyst activity was caused by low oxygen emitting capabilities of the composite oxide of cerium oxide and zirconium oxide, failure in securing the fine pore volume after the durability test due to the lack of effects relating to addition of the lanthanum compound to the alumina precursor, failure in securing the fine pore volume in the surface layer after the durability test, difficulty in exhaust gas reaching Rh particles due to excessive amounts of alumina, which could suppress both coagulation of the zirconium composite oxide and coagulation of the Rh particles, and a low fine pore volume in the catalyst layer. This made it difficult for exhaust gas to reach the noble metal.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:
1. An exhaust gas purifying catalyst, comprising:
at least one catalyst layer formed on an inner surface of a substrate and comprising a catalyst powder of individual catalyst powder particles, wherein each individual catalyst powder particle comprises:
a noble metal,
a first compound to which the noble metal is chemically anchored; and
a second compound configured to physically enclose and separate the first compound coupled to the noble metal from another first compound coupled to another noble metal;

wherein the at least one catalyst layer has fine pores P2 between the individual catalyst powder particles with a pore diameter of greater than 0.1 μm and less than or equal to 1 μm and wherein each individual catalyst powder particle has fine pores P1 within the catalyst powder particles with a pore diameter of 0.1 μm or less, and a pore volume of the fine pores P2 with the pore diameter of greater than 0.1 μm and less than or equal to 1 μm is equal to 10% to 60% of a fine pore volume of the fine pores with the pore diameter of 1.0 μm or less.

2. The catalyst according to claim 1 wherein a ratio of pore volume of the fine pores P2 with the pore diameter of greater than 0.1 μm and less than or equal to 1 μm to the pore volume of the fine pores P1 with the pore diameter of 0.1 μm or less is greater than or equal to 0.1.

3. The catalyst according to claim 1 wherein the pore volume of the fine pores P2 with the pore diameter of greater than 0.1 μm and less than or equal to 1 μm is equal to 20% to 60% of a fine pore volume of the fine pores with the pore diameter of 1.0 μm or less.

4. The catalyst according to claim 1 wherein the pore volume of the fine pores P2 with the pore diameter of greater than 0.1 μm and less than or equal to 1 μm is equal to 30% to 50% of a fine pore volume of the fine pores with the pore diameter of 1.0 μm or less.

5. The catalyst according to claim 1 wherein a total fine pore volume of the catalyst powder is greater than or equal to 0.24 cm$^3$/g but less than or equal to 0.8 cm$^3$/g.

6. The catalyst according to claim 1 wherein the first compound comprises 70 to 85 wt % $CeO_2$ and 15 to 30 wt % $ZrO_2$.

7. The catalyst according to claim 1 wherein the first compound comprises 90 to 99 wt % $ZrO_2$ and 1 to 10 wt % $La_2O_3$.

8. The catalyst according to claim 1 wherein the second compound comprises alumina.

9. The catalyst according to claim 1 wherein the second compound is alumina containing 5 to 15 wt % $CeO_2$ and 3 to 10 wt % $ZrO_2$.

10. The catalyst according to claim 1 wherein the second compound is alumina containing 3 to 10 wt % $La_2O_3$.

11. The catalyst according to claim 1 wherein the noble metal comprises at least one of Pt, Pd and Rh.

12. The catalyst according to claim 1 wherein the at least one catalyst layer comprises a plurality of catalyst layers formed on the inner surface of the substrate.

13. The catalyst according to claim 12, further comprising: an underlayer formed on the inner surface of the substrate and under the plurality of catalyst layers.

14. The catalyst according to claim 13 wherein the underlayer comprises at least one of alumina and a hydrocarbon adsorptive compound.

15. The catalyst according to claim 12 wherein the catalyst powder of an inner surface catalyst layer of the plurality of catalyst layers comprises the noble metal comprised of at least one of Pt and Pd, the first compound comprised of 70 to 85 wt % $CeO_2$ and 15 to 30 wt % $ZrO_2$ and the second compound comprised of alumina containing 5 to 15 wt % $CeO_2$ and 3 to 10 wt % $ZrO_2$.

16. The catalyst according to claim 12 wherein the catalyst powder of an inner surface catalyst layer of the plurality of catalyst layers comprises the noble metal comprised of at least one of Pt and Pd, the first compound comprised of 70 to 85 wt % $CeO_2$ and 15 to 30 wt % $ZrO_2$ and the second compound comprised of alumina containing 3 to 10 wt % $La_2O_3$.

17. The catalyst according to claim 12 wherein the catalyst powder of a surface catalyst layer of the plurality of catalyst layers comprises the noble metal comprised of Rh, the first compound comprised of 90 to 99 wt % $ZrO_2$ and 1 to 10 wt % $La_2O_3$ and the second compound comprised of alumina.

18. The catalyst according to claim 17 wherein the catalyst powder of the surface catalyst layer comprises 40 to 75 wt % of the first compound and 25 to 60 wt % of the second compound.

19. A method of producing an exhaust gas purifying catalyst, comprising:
preparing a catalyst powder of individual catalyst powder particles, the preparation including:
carrying a noble metal on a first compound wherein each individual catalyst powder particle has fine pores P1 within the catalyst powder particles with a pore diameter of 0.1 μm or less;
making a slurry of a second compound by dispersing the second compound or a precursor of the second compound in water;
dispersing the first compound carrying the noble metal in the slurry of the second compound;
drying the slurry of the second compound having the first compound and the noble metal; and
firing the dried slurry; and
forming the catalyst powder on an inner surface of a substrate including:
preparing a slurry of the catalyst powder by adding a fired-off compound;
coating the slurry of the catalyst powder on the substrate;
drying the coated slurry of the catalyst powder; and
forming a catalyst layer having fine pores P2 by firing the dried slurry of the catalyst powder, wherein the fine pores P2 have a pore diameter of greater than 0.1 μm and less than or equal to 1 μm.

20. The method according to claim 19 wherein a pore volume of the fine pores P2 with the pore diameter of greater than 0.1 μm and less than or equal to 1 μm is equal to 10% to 60% of a fine pore volume of the fine pores P1 with the pore diameter of 1.0 μm or less.

* * * * *